US011463772B1

(12) United States Patent
Wanjari et al.

(10) Patent No.: US 11,463,772 B1
(45) Date of Patent: Oct. 4, 2022

(54) SELECTING ADVERTISEMENTS FOR MEDIA PROGRAMS BY MATCHING BRANDS TO CREATORS

(71) Applicant: Amazon Technologies, Inc., Seattle, WA (US)

(72) Inventors: Harshal Dilip Wanjari, Issaquah, WA (US); Sanjeev Kumar, Redmond, WA (US); Ayman Mahfouz, Culver City, CA (US); Thomas Albert Faulhaber, Seattle, WA (US); Pratik GuhaRay, Kenmore, WA (US); Robert Eicher Simmering, Santa Ana, CA (US); Hsuan-Cheng Lai, Issaquah, WA (US); Ramasubramanian Balagurunathan, Redmond, WA (US); Juan Martin Borgnino, Marina Del Rey, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/491,137

(22) Filed: Sep. 30, 2021

(51) Int. Cl.
H04N 21/458 (2011.01)
G10L 15/02 (2006.01)
(Continued)

(52) U.S. Cl.
CPC .......... H04N 21/458 (2013.01); G10L 15/02 (2013.01); G10L 15/08 (2013.01);
(Continued)

(58) Field of Classification Search
CPC ............. H04N 21/458; H04N 21/4394; H04N 21/812; G10L 15/02; G10L 15/08; G10L 2015/088
See application file for complete search history.

(56) References Cited

U.S. PATENT DOCUMENTS 8,560,683 B2   10/2013   Funk et al.
8,572,243 B2   10/2013   Funk et al.
(Continued)

FOREIGN PATENT DOCUMENTS

AU   2013204532 B2   11/2014
CA   2977959 A1     9/2016
(Continued)

OTHER PUBLICATIONS

Tengeh, R. K., & Udoakpan, N. (2021). Over-the-Top Television Services and Changes in Consumer Viewing Patterns in South Africa. Management Dynamics in the Knowledge Economy. 9(2), 257-277 DOI 10.2478/mdke-2021-0018 ISSN: 2392-8042 (online) www.managementdynamics.ro; URL: https://content.sciendo.com/view/journals/mdke/mdke-overview.xml.
(Continued)

Primary Examiner — Nathan J Flynn
Assistant Examiner — Christine A Kurien
(74) Attorney, Agent, or Firm — Athorus, PLLC

(57) ABSTRACT

Advertisements for brands that are to be aired during media programs are selected based on similarities between the brands and creators of the media programs. As a media program is being aired, data representing content of a media program is processed to identify words being spoken or sung during the media program and sentiments associated with the media program. The media program is classified based on the words and sentiments, and a classification of the media program is compared to attributes of advertisements to determine which of the advertisements is best suited for airing during the media program. Additionally, a set of words that, if spoken or sung during a media program would establish conditions favorable to a given advertisement may be identified and provided to a creator.

20 Claims, 22 Drawing Sheets

(51) Int. Cl.
*H04N 21/439* (2011.01)
*H04N 21/81* (2011.01)
*G10L 15/08* (2006.01)

(52) U.S. Cl.
CPC ....... *H04N 21/4394* (2013.01); *H04N 21/812* (2013.01); *G10L 2015/088* (2013.01)

(56) References Cited

U.S. PATENT DOCUMENTS

| | | | |
|---|---|---|---|
| 9,003,032 | B2 | 4/2015 | Funk et al. |
| 9,369,740 | B1 | 6/2016 | Funk et al. |
| 9,706,253 | B1 | 7/2017 | Funk et al. |
| 9,729,596 | B2 | 8/2017 | Sanghavi et al. |
| 9,781,491 | B2 | 10/2017 | Wilson |
| 9,872,069 | B1 | 1/2018 | Funk et al. |
| 10,091,547 | B2 | 10/2018 | Sheppard et al. |
| 10,110,952 | B1 | 10/2018 | Gupta et al. |
| 10,135,887 | B1 | 11/2018 | Esser et al. |
| 10,140,364 | B1 | 11/2018 | Diamondstein |
| 10,313,726 | B2 | 6/2019 | Woods et al. |
| 10,356,476 | B2 | 7/2019 | Dharmaji |
| 10,432,335 | B2 | 10/2019 | Bretherton |
| 10,489,395 | B2 | 11/2019 | Lakkur et al. |
| 10,698,906 | B2 | 6/2020 | Hargreaves et al. |
| 10,719,837 | B2 | 7/2020 | Kolowich et al. |
| 10,769,678 | B2 | 9/2020 | Li |
| 10,846,330 | B2 * | 11/2020 | Shilo ..................... G06F 16/958 |
| 10,985,853 | B2 | 4/2021 | Bretherton |
| 10,986,064 | B2 | 4/2021 | Siegel et al. |
| 10,997,240 | B1 | 5/2021 | Aschner et al. |
| 2002/0042920 | A1 | 4/2002 | Thomas et al. |
| 2002/0056087 | A1 | 5/2002 | Berezowski et al. |
| 2007/0124756 | A1 | 5/2007 | Covell et al. |
| 2007/0271518 | A1 | 11/2007 | Tischer et al. |
| 2007/0271580 | A1 | 11/2007 | Tischer et al. |
| 2008/0086742 | A1 | 4/2008 | Aldrey et al. |
| 2009/0044217 | A1 | 2/2009 | Lutterbach et al. |
| 2009/0076917 | A1 | 3/2009 | Jablokov et al. |
| 2010/0088187 | A1 | 4/2010 | Courtney et al. |
| 2011/0067044 | A1 | 3/2011 | Albo |
| 2012/0191774 | A1 | 7/2012 | Bhaskaran et al. |
| 2012/0304206 | A1 * | 11/2012 | Roberts .................. H04H 60/56 725/12 |
| 2012/0311618 | A1 | 12/2012 | Blaxland |
| 2013/0074109 | A1 | 3/2013 | Skelton et al. |
| 2013/0247081 | A1 | 9/2013 | Vinson et al. |
| 2014/0019225 | A1 | 1/2014 | Guminy et al. |
| 2014/0040494 | A1 | 2/2014 | Deinhard et al. |
| 2014/0108531 | A1 | 4/2014 | Klau |
| 2014/0123191 | A1 | 5/2014 | Hahn et al. |
| 2014/0325557 | A1 | 10/2014 | Evans et al. |
| 2014/0372179 | A1 | 12/2014 | Ju et al. |
| 2015/0163184 | A1 | 6/2015 | Kanter et al. |
| 2015/0289021 | A1 | 10/2015 | Miles |
| 2015/0319472 | A1 | 11/2015 | Kotecha et al. |
| 2016/0188728 | A1 | 6/2016 | Gill et al. |
| 2016/0266781 | A1 | 9/2016 | Dandu et al. |
| 2017/0127136 | A1 | 5/2017 | Roberts et al. |
| 2017/0289617 | A1 | 10/2017 | Song et al. |
| 2018/0025078 | A1 | 1/2018 | Quennesson |
| 2018/0255114 | A1 | 9/2018 | Dharmaji |
| 2018/0322411 | A1 | 11/2018 | Wang et al. |
| 2019/0132636 | A1 | 5/2019 | Gupta et al. |
| 2021/0256086 | A1 | 8/2021 | Askarian et al. |
| 2022/0038783 | A1 | 2/2022 | Wee |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

* cited by examiner

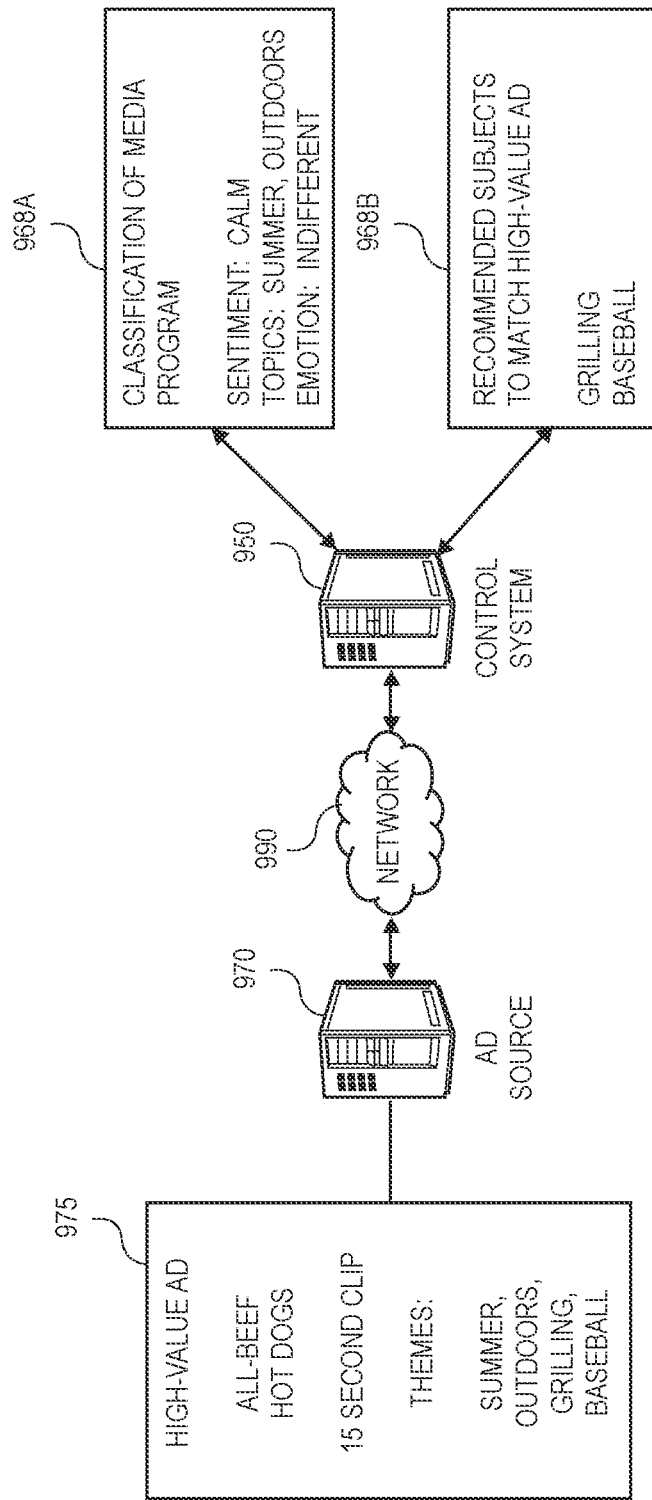

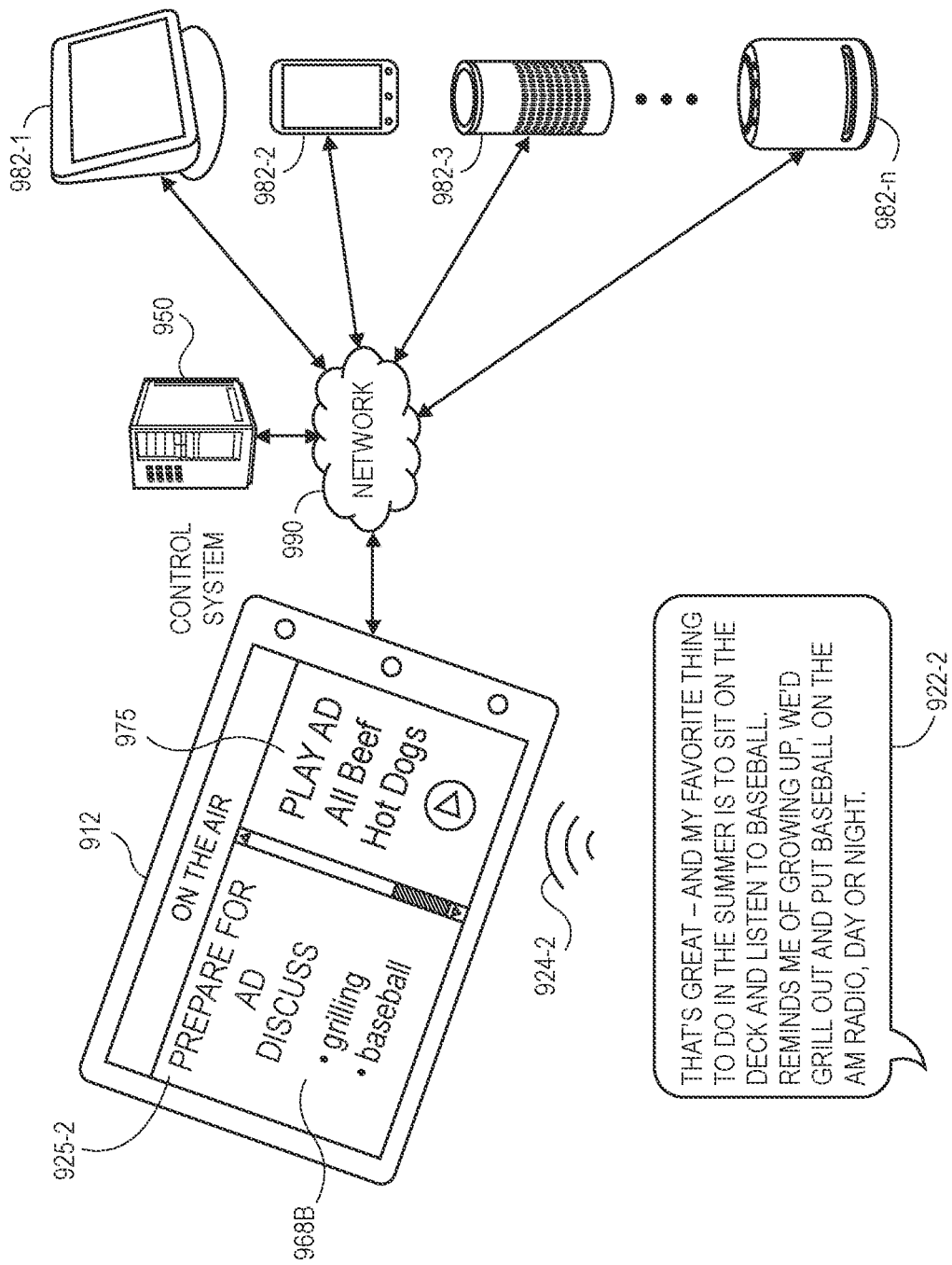

SELECTING ADVERTISEMENTS FOR MEDIA PROGRAMS BY MATCHING BRANDS TO CREATORS

BACKGROUND

Today, many media programs are broadcast "live" to viewers or listeners over the air, e.g., on radio or television, or streamed or otherwise transmitted to the viewers or listeners over one or more computer networks which may include the Internet in whole or in part. The media programs may include music, comedy, "talk" radio, interviews or any other content.

In many instances, media content presented to viewers or listeners in accordance with a media program is also accompanied by one or more advertisements. Such advertisements, which are typically presented to the viewers or listeners in the same medium as the media program, may include offers or descriptions of any type or form of products, or state any other relevant information. For example, a radio broadcast or television program usually includes commercial breaks during which commercials for goods or services, or public service announcements, are aired, and the times or durations of such breaks are commonly selected with a goal of maximizing engagement with the commercials by viewers or listeners. Some radio programs of extended durations include or require breaks at or near fixed times, e.g., at a common number of minutes after or before each hour, while some television shows may include breaks that are synchronized with a plot of a pre-recorded program, or at natural or convenient times during a live program, and one or more commercials are aired during such breaks.

A price of airing an advertisement during a break typically depends on a timing and a duration of the break. Advertisements that are aired at times or during programs that are expected to have larger numbers of viewers or listeners usually command a greater price than advertisements that are aired at times or during programs that are expected to have smaller numbers of viewers or listeners. Accordingly, providers of goods or services that wish to maximize their advertising reach seek to have their commercials aired during breaks in programs that are generally popular, or during breaks in programs that are popular to demographics that are known or believed to be interested in one or more of their goods or services.

Existing methods for selecting and presenting advertisements to viewers or listeners of media programs are occasionally plagued with a number of limitations. For example, while some advertisements are selected for presentation during breaks in a media program based on predicted attributes of viewers or listeners, whether content of an advertisement is relevant to an actual state of the media program, such as subjects or topics of conversation between participants in the media program, or sentiments or emotions of the participants, is not commonly considered. Instead, where an advertisement includes a set of words to be spoken or sung by a participant in a media program, or media content to be included or inserted into the media program, the advertisement is typically aired or inserted into the media program at a desired time regardless of the actual state of the media program at that time.

BRIEF DESCRIPTION OF THE DRAWINGS

FIGS. 9A through 9C are views of aspects of one system for selecting advertisements for media programs, in accordance with embodiments of the present disclosure.

DETAILED DESCRIPTION

Figure 1A:
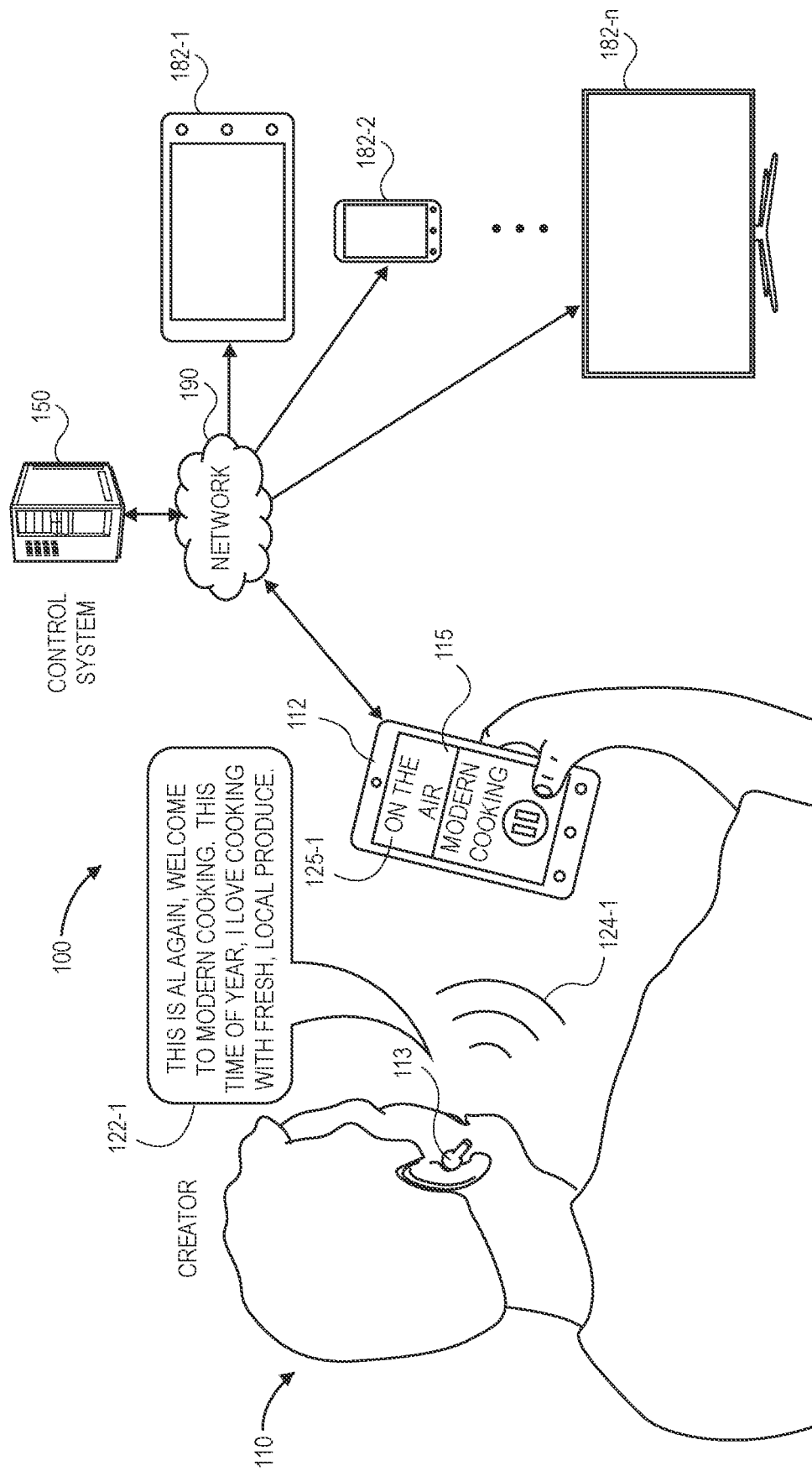
FIGS. 1A through 1F are views of aspects of one system for selecting advertisements for media programs, in accordance with embodiments of the present disclosure.

As is set forth in greater detail below, the present disclosure is directed to systems and methods for selecting advertisements for media programs. More specifically, one or more implementations of the present disclosure are directed to identifying a brand (e.g., a mark, a name, a term, or any other feature that identifies items, products, goods or services from one source as distinct from other sources) that most closely corresponds to a creator of a live media program that is broadcast to systems or devices over computer networks, including but not limited to the Internet. An advertisement for one or more products associated with the brand may be aired during the live media program of the creator.

More specifically, the systems and methods of the present disclosure are directed to identifying portions of media content that are being transmitted to devices of listeners in accordance with a media program associated with a creator, and processing the portions of the media content to not only transcribe the media content into one or more sets of words but also determine acoustic features of the media program. The creator of the media program may be classified based on the sets of words, and also the acoustic features, along with any available metadata regarding the media program, and any features that were previously identified for or are historically associated with the creator. Likewise, the systems and methods of the present disclosure are further directed to identifying portions of media content associated with advertisements for products of a brand, and processing the portions of media content to not only transcribe the media content into one or more sets of words but also determine acoustic features associated with the brand or the advertisements. The brand may be classified based on the sets of words, and also the acoustic features, along with any available metadata regarding products of the brand, and any feedback regarding the brand that may have been received from one or more customers.

A brand that most closely matches the creator may be identified based on classifications of the brand and the creator using one or more machine learning models (e.g., algorithms, systems or techniques). An advertisement for the brand or one or more products of the brand may be selected for airing during one or more media programs associated with the creator. For example, where a plurality of advertisements for products of a brand that most closely matches a creator are available, one of the advertisements may be selected based on the acoustic features of the media program during which the advertisement is to be aired, or on any other basis. Additionally, a creator may be provided an opportunity to accept any recommendation of a brand or an advertisement, or to reject the recommendation.

Alternatively, or additionally, where an advertisement for a brand or a product of the brand is identified on any basis, subject matter of a media program that would create conditions most favorable for the advertisement, e.g., to maximize a level of engagement with the advertisement, may be identified and presented to a creator of the media program, as the media program is being aired. For example, sets of words or acoustic features (or audio features) that are predicted to cause a media program to have a desired or preferred subject or sentiment may be provided to a creator of the media program, who may attempt to steer the media program toward the desired or preferred subject or sentiment by speaking or singing such words, or inducing such acoustic features, and to thereby create the conditions that are most favorable for the advertisement.

Referring to FIGS. 1A through 1F, views of aspects of one system for selecting advertisements for media programs, in accordance with embodiments of the present disclosure are shown. As is shown in FIG. 1A, a system 100 includes a mobile device 112 (e.g., a smartphone, a tablet computer, a laptop computer, or any other system or device) of a creator 110 (e.g., a user, or a host), a control system 150 (e.g., one or more servers or other computer systems) and a plurality of computer devices 182-1, 182-2 . . . 182-n or other systems of any number of listeners (or viewers) that are connected to one another over one or more networks 190, which may include the Internet in whole or in part. The creator 110 wears one or more ear buds 113 (or earphones, or headphones) or other communication systems or devices which may be in communication with the mobile device 112, and may exchange (e.g., transfer or receive) data relating to audio signals or any other data with the mobile device 112. The computer device 182-1 is a tablet computer or like system. The computer device 182-2 is a smartphone or like system. The computer device 182-n is a television or like system. However, the computer systems or devices that may be operated or utilized in accordance with the present disclosure are not limited by any of the devices or systems shown in FIG. 1A.

As is shown in FIG. 1A, the mobile device 112 includes a display 115 (e.g., a touchscreen) having a user interface 125-1 rendered thereon. The user interface 125-1 may include one or more interactive or selectable elements or features that enable the creator 110 to control the transmission or receipt of media content in accordance with the media program, e.g., by the control system 150 or from any other source, to the computer devices 182-1, 182-2 . . . 182-n over the networks 190. In some implementations, the control system 150 may establish a two-way or bidirectional channel or connection with the mobile device 112, and one-way or unidirectional channels or connections with the devices 182-1, 182-2 . . . 182-n. In some other implementations, the control system 150 may establish two-way or bidirectional channels with the mobile device 112, and any number of the devices 182-1, 182-2 . . . 182-n.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1A, the creator 110 provides an utterance 122-1 of one or more words that are intended to be heard by one or more listeners using the computer devices 182-1, 182-2 . . . 182-n. In particular, the creator 110 uses the utterance 122-1 to describe a media program relating to cooking, viz., "This is Alice again, welcome to Modern Cooking. This time of year, I love cooking with fresh, local produce," in accordance with a broadcast plan for the media program or spontaneously. The mobile device 112 and/or the ear buds 113 may capture audio data 124-1 representing the utterance 122-1 of the creator 110, and transmit the data 124-1 to the control system 150 over the one or more networks 190. The control system 150 may then cause data, e.g., some or all of the data 124-1, to be transmitted to one or more computer systems or devices of listeners over one or more networks 190, including but not limited to the computer devices 182-1, 182-2 . . . 182-n.

In some implementations, the user interfaces of the present disclosure (viz., the user interface 125-1, or others) may include one or more features enabling the creator 110 to exercise control over the media content being played by the devices 182-1, 182-2 . . . 182-n of the listeners. For example, such features may enable the creator 110 to manipulate a volume or another attribute or parameter (e.g., treble, bass, or others) of audio signals represented in data transmitted to the respective devices 182-1, 182-2 . . . 182-n of the listeners by one or more gestures or other interactions with a user interface rendered on the mobile device 112. In response to instructions received from the mobile device 112 by such gestures or interactions, the control system 150 may modify the data transmitted to the respective devices 182-1, 182-2 . . . 182-n of the listeners accordingly.

Alternatively, or additionally, the user interfaces of the present disclosure may include one or more elements or features for playing, pausing, stopping, rewinding or fast-forwarding media content to be represented in data transmitted to the respective devices 182-1, 182-2 . . . 182-n. For example, the user interfaces may further include one or more elements or features for initiating a playing of any type or form of media content from any source, and the control system 150 may establish or terminate channels or connections with such sources, as necessary, or modify data transmitted to the respective devices 182-1, 182-2 . . . 182-n of the listeners to adjust audio signals played by such devices, in response to gestures or other interactions with such elements or features. The user interfaces may further include any visual cues such as "on the air!" or other indicators as to media content that is currently being played, and from which source, as well as one or more clocks, timers or other representations of durations for which media content has been played, times remaining until the playing of media content is expected to end or be terminated, or times at which other media content is to be played.

Figure 1B:
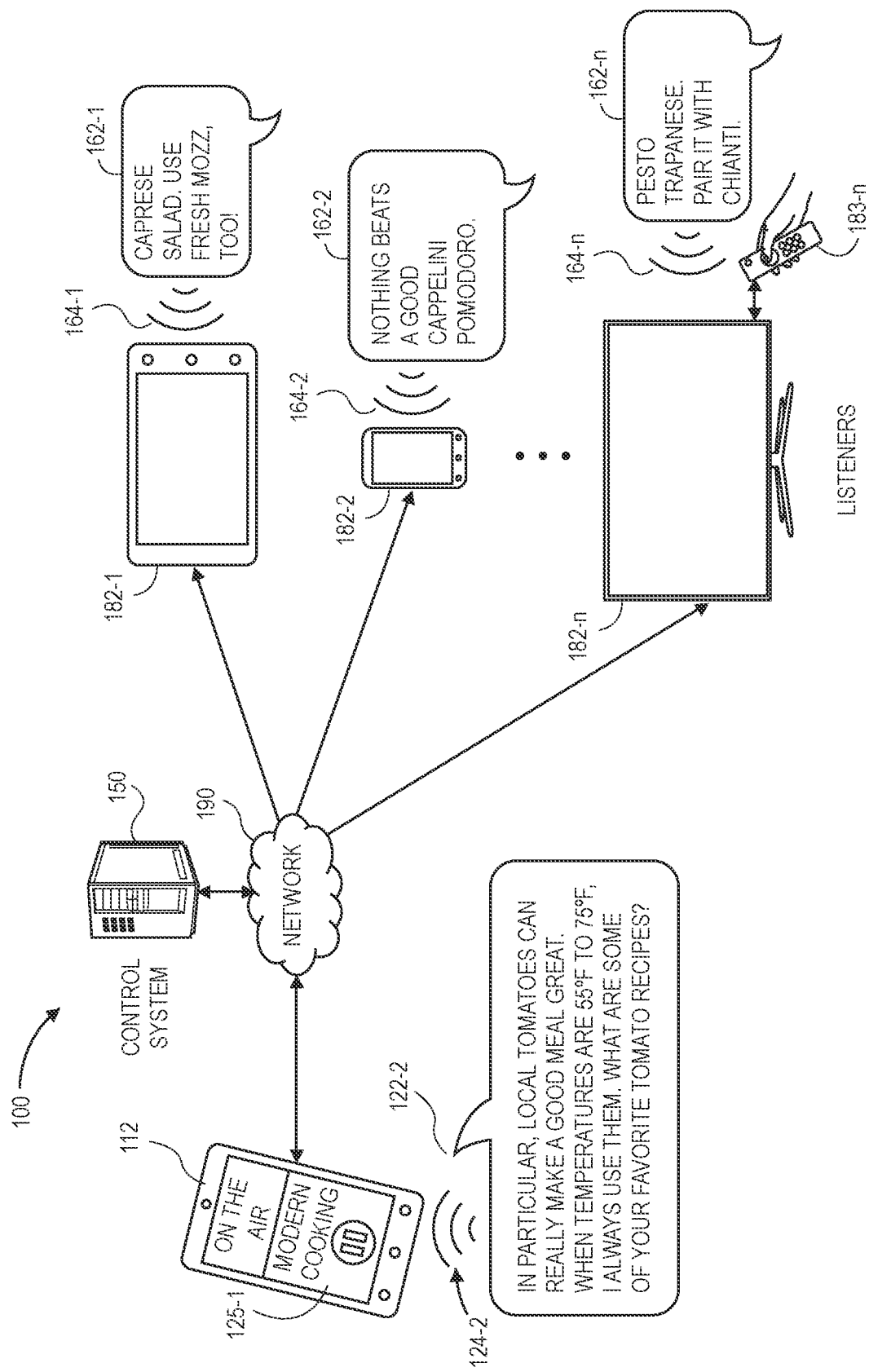

As is shown in FIG. 1B, the creator 110 invites listeners associated with the devices 182-1, 182-2 . . . 182-n to participate in the media program, e.g., by providing audio feedback via one or more microphones or other acoustic sensors provided on the respective devices 182-1, 182-2 . . . 182-n. Media content including data representing spoken words by the creator 110 and the respective listeners captured by the mobile device 112 and the devices 182-1, 182-2 . . . 182-n, respectively, is received by the control system 150 and transmitted to the mobile device 112 or the devices 182-1, 182-2 . . . 182-n in accordance with the media program. In some implementations, when a listener attempts or requests to participate in the media program using one of the devices 182-1, 182-2 . . . 182-n, the control system 150 may close or disestablish a one-way or unidirectional channel or connection with the one of the devices 182-1, 182-2 . . . 182-n, and establish a two-way or bidirectional channel with the one of the devices 182-1, 182-2 . . . 182-n, in order to accommodate the two-way transfer of data between the one of the devices 182-1, 182-2 . . . 182-n and the control system 150.

In accordance with the media program, the creator 110 and listeners using the devices 182-1, 182-2 . . . 182-n exchange questions, answers and other commentary by way of the control system 150 and the one or more networks 190. For example, as is shown in FIG. 1B, the creator 110 provides an utterance 122-2 in accordance with a theme of the media program, viz., "In particular, local tomatoes can really make a good meal great. When temperatures are between 55° F. and 75° F., I always use them. What are some of your favorite tomato recipes?" The mobile device 112 and/or the ear buds 113 capture audio data 124-2 representing the utterance 122-2, and transmit the data 124-2 to the control system 150 over the one or more networks 190.

In reply, a listener using the device 182-1 provides an utterance 162-1, viz., "Caprese Salad. Use fresh mozz, too!" A listener using the device 182-2 provides an utterance 162-2, viz., "Nothing beats a good Capellini Pomodoro." A listener using the device 182-n provides an utterance 162-n, viz., "Pesto Trapanese. Pair it with Chianti." The respective devices 182-1, 182-2 . . . 182-n capture data 164-1, 164-2 . . . 164-n representing the utterances 162-1, 162-2 . . . 162-n, and transmit the data 164-1, 164-2 . . . 164-n to the control system 150 over the one or more networks 190. Alternatively, or additionally, an auxiliary device 183-n (e.g., a voice-enabled remote control) associated with the device 182-n may capture and transmit at least some of the data 164-n to the device 182-n, which may then transmit the data 164-n and any other metadata to the control system 150 over the one or more networks 190.

The control system 150 may then cause data, e.g., some or all of the data 124-2 or the data 164-1, 164-2 . . . 164-n and any other information, data or metadata, to be transmitted to the device 112 and the devices 182-1, 182-2 . . . 182-n over the one or more networks 190. Alternatively, or additionally, any number of listeners who heard the utterance 122-2 may provide responses, or decline to provide any such responses. A number of listeners that receive audio signals from the creator 110 or the control system 150, or provide feedback to the creator 110 and the control system 150, may be any number, such as several, dozens, hundreds, thousands or more listeners.

In accordance with implementations of the present disclosure, data representing words spoken or sung by a creator or any participants (e.g., listeners, guests or others) during a media program may be processed to transcribe the data into text, and to determine any acoustic features of the data, including not only sentiments but also opinions, meanings, tone, genres, topics or others, as well as frequencies, intensities, speech rates, and others. Such data may be processed along with any available metadata regarding the media program, and any historical information regarding the creator, to classify the creator using one or more machine learning models or by any other technique.

Figure 1C:
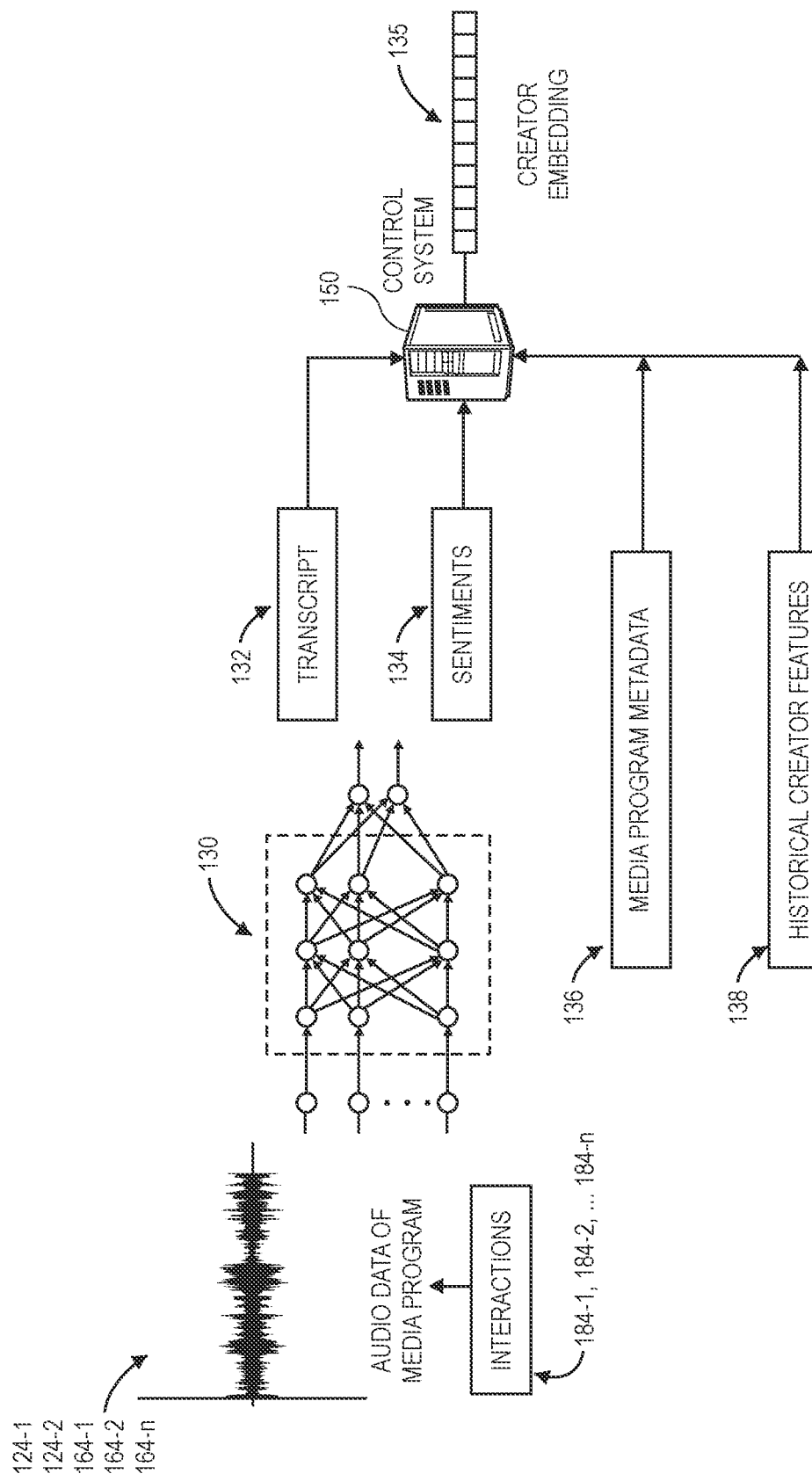

As is shown in FIG. 1C, the data 124-1, 124-2 representing the utterances 122-1, 122-2 shown in FIGS. 1A and 1B and the data 164-1, 164-2 . . . 164-n representing the feedback received from listeners in the form of the utterances 162-1, 162-2 . . . 162-n shown in FIG. 1B is provided as inputs to a machine learning model 130 (e.g., an artificial neural network), along with any interactions 184-1, 184-2 . . . 184-n received from the devices 182-1, 182-2 . . . 182-n during the media program, which may be processed or otherwise interpreted individually or collectively to determine a sentiment, an emotion, an opinion, or any other feature of one or more listeners to the media program, at any given time with respect to the media program. For example, in some implementations, the interactions 184-1, 184-2 . . . 184-n may include, but need not be limited to, actions by listeners to participate in the media program, e.g., by attempting to contact the control system 150 or the device 112 of the creator 110 using one of the devices 182-1, 182-2 . . . 182-n, as well as words or audio data provided by such listeners, including any of the utterances 122-1, 122-2, 162-1, 162-2 . . . 162-n or any of the data 124-1, 124-2, 164-1, 164-2 . . . 164-n.

The interactions 184-1, 184-2 . . . 184-n may also include actions by a user to play or pause a media program, or to fast-forward or rewind the media program. Likewise, the interactions 184-1, 184-2 . . . 184-n may further include, but need not be limited to, actions by a user to generate, send or read a chat message to or from any user of the media program. The interactions 184-1, 184-2 . . . 184-n may also include attempts by users to join a media program, which may be processed or interpreted to determine that the user is interested in media content of the media program, or efforts to stop a media program, search for another media program, or end the playing of media altogether either permanently or for a period of time, which may be processed or interpreted to determine that the user is uninterested in the media content of the media program at the given time. The interactions 184-1, 184-2 . . . 184-n may further include interactions with interactive features having symbols representative of emotions or opinions, which may be interpreted to determine emotions or opinions of such users regarding the media program. Alternatively, any other interactions received from devices of listeners to the media program may be identified and provided as an input to the machine learning model 130 in accordance with implementations of the present disclosure.

The machine learning model 130 may be executed by the control system 150 shown in FIG. 1A or 1B, or by any other computer device or system (not shown). The machine learning model 130 may be trained to extract any features regarding the creator 110 from the data 124-1, 124-2, 164-1, 164-2 . . . 164-n, such as to identify a transcript 132 of words represented in the data 164-1, 164-2 . . . 164-n, or sentiments 134 or any other acoustic features of the data 164-1, 164-2 . . . 164-n. Such acoustic features may include, but need not be limited to, frequencies or sound pressure levels of the data 124-1, 124-2, 164-1, 164-2 . . . 164-n, expressed individually or collectively, as well as any topics, meanings, tones, genres, topics, emotions or other features.

The machine learning model 130 may be any type of algorithm, system or technique, or multiple algorithms, systems or techniques, such as an artificial neural network, e.g., a recurrent neural network or a convolutional neural network, a transformer, e.g., a bidirectional encoder representations from transformer (or "BERT") model, or one or more latent Dirichlet allocations, matrix factorizations, latent semantic analyses, pachinko allocation models or others, that are trained to transcribe data into text or determine any acoustic features of data in accordance with implementations of the present disclosure. In some implementations, words or other features may be identified within audio data to varying degrees of confidence or probability, which may be represented in one or more levels or scores.

The transcript 132 of text and the sentiments 134 or any other acoustic features may be processed along with metadata 136 of the media program and other creator features 138 that have been historically or previously observed regarding the creator 110 in order to classify the creator 110 in any manner and on any basis. For example, the metadata 136 may include, but need not be limited to, one or more text-based descriptions of the media program, as well as one or more viewer ratings or descriptors, including but not limited to identifiers of the creator 110, any other media programs of the creator 110, or any listeners to any of such media programs. The metadata 136 may also include any content-based ratings or classifications of such media programs, e.g., viewer ratings for maturity or other designated content, as well as any sentiments or other acoustic features that have been previously identified or extracted from media content of such programs. The historical creator features 138 may include, but need not be limited to, information or data regarding any media programs previously aired or otherwise associated with the creator 110, e.g., any text or acoustic features of such programs, or any metadata regarding such programs, as well as any ratings of such programs, or feedback received from listeners to such programs, or any other information or data regarding the creator 110 or any media programs with which the creator 110 is associated.

The control system 150 may process the outputs received from the machine learning model 130, e.g., the transcript 132 and the sentiments 134, as well as the metadata 136 and the historical creator features 138, to derive a creator embedding 135 (or vector) representative of the creator 110. The creator embedding 135 may include data representative of the transcript 132 of the text, the sentiments 134 (or other acoustic features), the metadata 136 or the historical creator features 138, or any other data. The creator embedding 135 may have any length or number of bits, each of which may include values that are binary in nature (e.g., values of zero or one), or non-binary values (e.g., of any value), that represent any aspect of the creator 110, as determined from the transcript 132, the sentiments 134, the metadata 136 or the historical creator features 138.

Figure 1D:
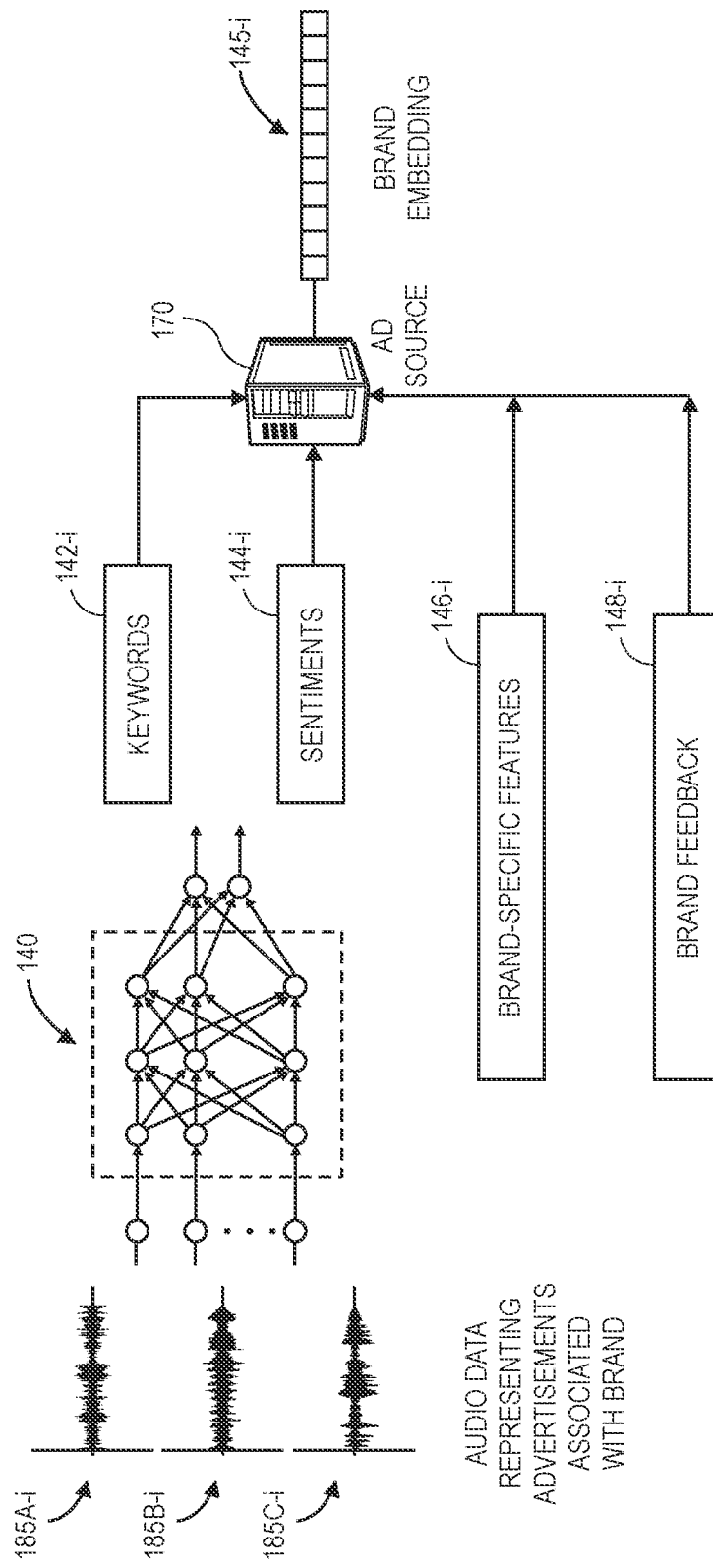

Once the creator 110 has been classified, e.g., by the creator embedding 135, a brand may be matched to the creator 110, and one or more advertisements for the brand or for products of the brand may be selected for airing during the media program. As is shown in FIG. 1D, the creator embedding 135 determined by the control system 150 may be compared to information or data regarding advertisements of a plurality of brands stored in or by an advertisement source 170, which may be a may be a repository, bank, or other system having any information or data regarding any number of brands, as well as advertisements for such brands or products of such brands stored thereon. For example, information or data regarding each of the brands may include, but need not be limited to, sets of text to be spoken or sung by one or more participants in a media program, such as while the media program is in progress, as well as audio or video clips or other sets of media content, or any other information or data that may be presented to listeners during the media program. The information or data regarding each of the brands may also include offers or descriptions of products (e.g., goods or services) of any type or form, or information or data regarding one or more brands that offer such products to customers.

In some implementations, in order to match one of a brand with the creator 110, classifications or representations of each of a plurality of brands may be calculated and compared to the creator embedding 135, or another classification or embedding of the creator 110, to determine which of such classifications or representations of the brands is a closest match to the creator embedding 135. As is shown in FIG. 1D, for each of a plurality of brands, audio data 185A-i, 185B-i, 185C-i representing advertisements associated with such brands may be provided to a machine learning model 140, which may be executed by the advertisement source 170, or by any other computer device or system, e.g., the control system 150. The machine learning model 140 may be trained to extract any features from the data 185A-i, 185B-i, 185C-i, such as to identify a set of keywords 142-i or any sentiments (or other acoustic features) 144-i that are represented in or may be derived from the data 185A-i, 185B-i, 185C-i, and associated with the respective brands. The machine learning model 140 may also be trained to identify any other acoustic features of the data 185A-i, 185B-i, 185C-i, which may further include any other information, data or metadata regarding respective ones of the brands, e.g., text-based descriptions of the advertisements, indications of their respective conversion rates or efficacies, or others, and need not be limited to audio data. Such acoustic features may include, but need not be limited to, frequencies or sound pressure levels of the data 185A-i, 185B-i, 185C-i, expressed individually or collectively within such advertisements, as well as any topics, meanings, tones, genres, topics, emotions or other features. The machine learning model 140 may be any type of algorithm, system or technique.

The keywords 142-i and the sentiments 144-i or any other acoustic features may be processed along with any brand-specific features 146-i of one of the brands (or features of products of the one of the brands) and any feedback 148-i regarding one of the brands, e.g., from customers or other sources, in order to classify the one of the brands in any manner and on any basis.

For example, the brand-specific features 146-i may include identifiers of types or categories of products of the brands, e.g., whether a brand is associated with clothing, fitness, services, or any other type or category of products, and the feedback 148-i may include customer ratings, commentary, sales figures or other data or feedback regarding one of the brands, which may be obtained from any source.

The advertisement source 170 (or the control system 150) may process the outputs received from the machine learning model 140, e.g., the keywords 142-i and the sentiments 144-i, as well as the brand-specific features 146-i and the feedback 148-i, to derive one brand embedding 145-i (or vector) representative of each of the brands. The brand embeddings 145-i may include data representative of the keywords 142-*i*, the sentiments 144-*i*, the brand-specific features 146-*i* and the feedback 148-*i*, or any other data. Each of the brand embeddings 145-*i* may have any length or number of bits, each of which may include values that are binary in nature (e.g., values of zero or one), or non-binary values (e.g., of any value), that represent any aspect of respective ones of the brands, as determined from the keywords 142-*i* and the sentiments 144-*i*, as well as the brand-specific features 146-*i* and the feedback 148-*i*.

After the creator 110 and each of a plurality of brands have been classified or represented, e.g., by the creator embedding 135 calculated as described above with regard to FIG. 1C, or brand embeddings 145-1, 145-2, 145-3 calculated for each of such brands as is described above with regard to FIG. 1D, one of the brands is selected for the creator 110 based on a similarity with or proximity to one of the brand embeddings 145-1, 145-2, 145-3.

Figure 1E:
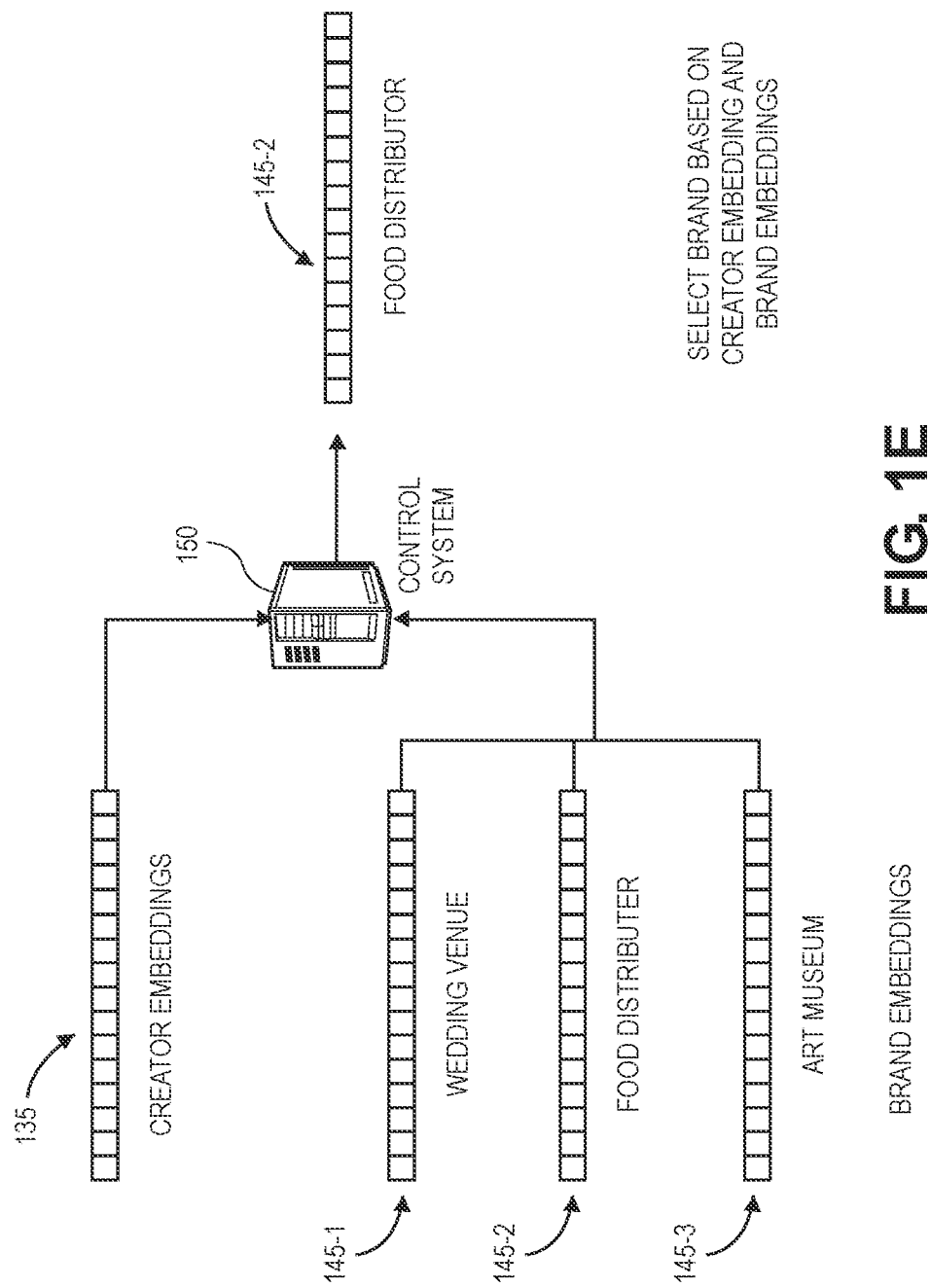

As is shown in FIG. 1E, the control system 150 compares the creator embedding 135 to each of the brand embeddings 145-1, 145-2, 145-3, which represent a wedding venue, a food distributor and an art museum, respectively. The control system 150 further determines that the brand embedding 145-2, viz., for the food distributor, most closely matches the creator embedding 135. In some implementations, the control system 150 may calculate dot products between each of the brand embeddings 145-1, 145-2, 145-3 and the creator embedding 135, and select the one of the brand embeddings 145-1, 145-2, 145-3 having the greatest dot product with the creator embedding 135 as the closest match. Alternatively, a brand that most closely matches the creator 110 may be selected on any other basis using the creator embedding 135 and/or the brand embeddings 145-1, 145-2, 145-3. For example, the creator embedding 135 may be compared to the brand embeddings 145-1, 145-2, 145-3 by calculating cross products or vector products between the creator embedding 135 and each of the brand embeddings 145-1, 145-2, 145-3, or by any other comparison or relations.

Figure 1F:
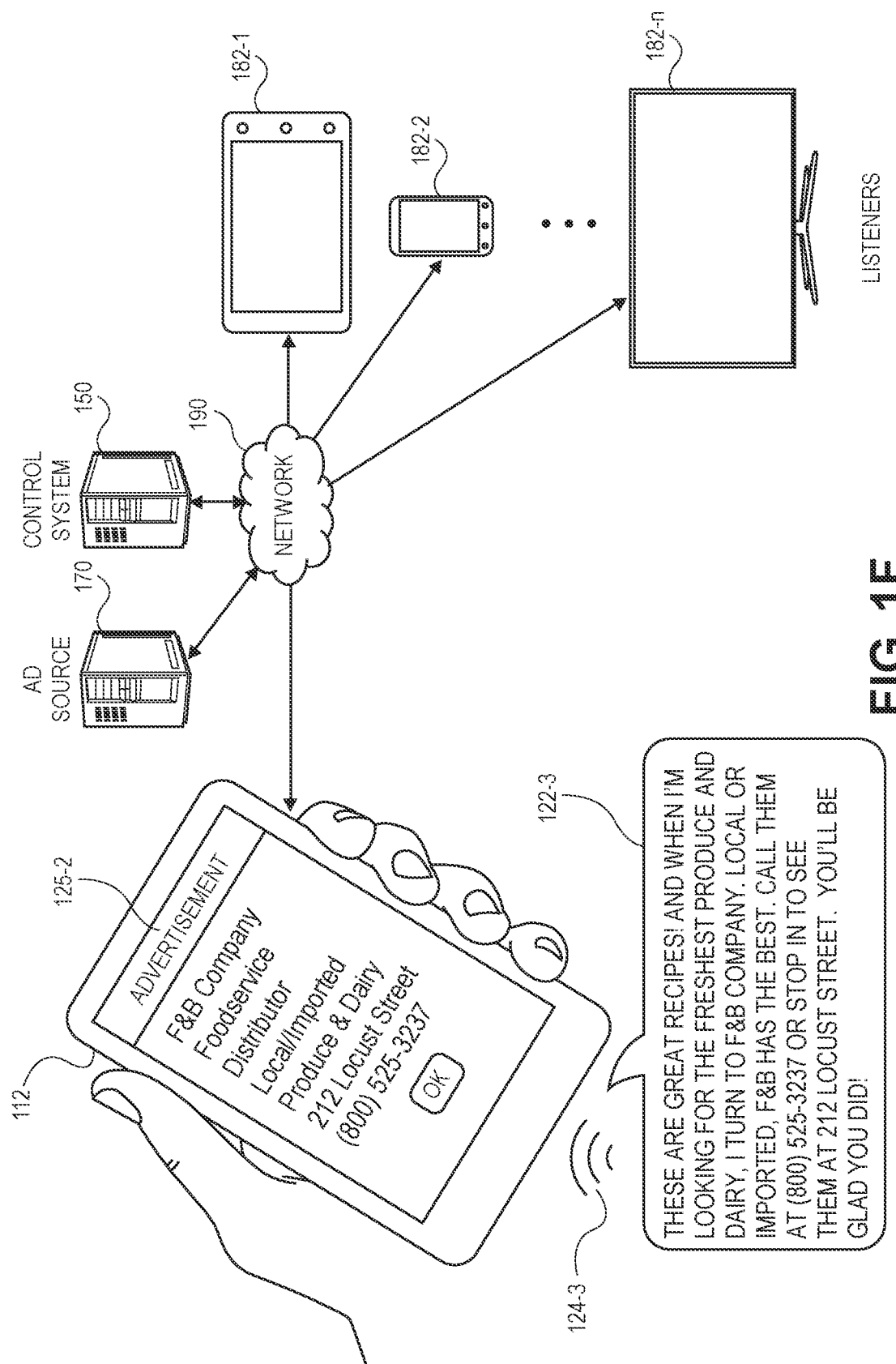

After the brand embedding 145-2 of one of the brands, viz., the food distributor, has been matched to the creator 110, information regarding an advertisement associated with the brand may be provided to the creator 110, by way of the mobile device 112 or otherwise, and the creator 110 may cause the advertisement to be presented to listeners by way of the devices 182-1, 182-2 . . . 182-*n*. The advertisement may be for the brand itself, or an advertisement for one or more products (e.g., goods or services) associated with the brand. As is shown in FIG. 1F, the mobile device 112 includes a user interface 125-2 rendered on the display 112. The user interface 125-2 displays information regarding the advertisement for the brand to the creator 110, who may read some or all of the information aloud during the media program. The information rendered in the user interface 125-2 may include a general summary of the brand or products associated with the brand, along with contact information for the brand, or any other information or data. In some implementations, the creator 110 may be permitted or expected to select and speak or sing words of his or her own choosing to describe the brand or products associated with the brand when presenting the advertisement to the listeners by way of the devices 182-1, 182-2 . . . 182-*n*, such as on an ad lib. basis. In some other implementations, the user interface 125-2 may display an exact set of words to be spoken or sung during the media program by the creator 110, who may not be permitted to deviate from such words or present the advertisement on an ad lib. basis.

As is further shown in FIG. 1F, the creator 110 provides an utterance 122-3 of one or more words that are intended to be heard by one or more listeners using the computer devices 182-1, 182-2 . . . 182-*n*. In particular, the creator 110 uses the utterance 122-3 to present the advertisement for the food distributor to listeners, viz., "These are great recipes! And when I'm looking for the freshest produce and dairy, I turn to F&B Company. Local or imported, F&B has the best. Call them at (800) 525-3237 or stop in to see them at 212 Locust Street. You'll be glad you did!," in accordance with a broadcast plan for the media program or spontaneously. The mobile device 112 and/or the ear buds 113 may capture audio data 124-2 representing the utterance 122-3 of the creator 110, and transmit the data 124-2 to the control system 150 over the one or more networks 190. The control system 150 may then cause data, e.g., some or all of the data 124-2, to be transmitted to one or more of the devices 182-1, 182-2 . . . 182-*n*.

Alternatively, in some implementations, the mobile device 112 may include one or more buttons or other selectable elements, e.g., on the user interface 125-2 or elsewhere, for causing the advertisement to be presented to the listeners by way of the devices 182-1, 182-2 . . . 182-*n*. For example, in some implementations, where the advertisement includes one or more clips or other sets of media content, selecting such a button or other element on the mobile device 112 may cause a one-way or unidirectional channel or connection to be established between the control system 150 and the advertisement source 170, and an advertisement may be transmitted to the mobile device 112 and the devices 182-1, 182-2 . . . 182-*n* via the one-way or unidirectional channel by way of the control system 150.

Furthermore, where an advertisement selected for a brand includes clips or other sets of media content, one or more sets of words may be provided to the creator 110 to describe the advertisement, or one or more products of the brand, and to prepare listeners for the advertisement for the brand, or to create conditions for optimizing the effects of the advertisement for the brand on such listeners. For example, a set of words that, if spoken, may cause the media program to have a desired subject or a desired sentiment that is most optimal for a given advertisement may be provided to the creator 110, e.g., by way of the mobile device 112 or otherwise.

In some implementations, the user interface 125-2 may further include information or data regarding anticipated or projected returns based on a selected advertisement, such as a number of users (e.g., listeners) that the advertisement is expected to reach, as well as specific devices (e.g., mobile devices, automobiles, desktop computers) from which the listeners are expected to receive the advertisement. The user interface 125-2 may further include projected revenues for the brand and for the creator 110 that are projected, as well as a conversion rate that has been calculated for the advertisement or the brand, in association with the media program of the creator 110.

Furthermore, the user interface 125-2 may also include one or more selective or interactive features that permit the creator 110 to accept or reject a recommendation of an advertisement or a brand determined based on the creator embedding 135 and the brand embeddings 145-1, 145-2, 145-3, or others. Such features may permit the creator 110 to exercise ultimate control over media content to be aired in accordance with his or her media program, as well as the advertisements, brands or products that are associated with the media program.

The processing of data presented during a media program to select advertisements for the media program, such as shown in FIGS. 1A through 1F, may be performed at regular intervals during the media program. In some implementations, a classification of a creator of a media program, e.g., the creator embedding 135, may be updated or repeated on any number of occasions, and compared to the brand embeddings 145-1, 145-2, 145-3 or others, such that different brands or advertisements may be identified and selected for the media program based on the updated classification, as necessary.

Accordingly, the systems and methods of the present disclosure may be used to select advertisements to be presented during media programs based on aspects of media content presented in accordance with the media programs, e.g., as the media programs are in progress. In some implementations, creators may create media programs based on their specific and unique talents, and on subjects that fall within their ken or expertise. Instead of requiring creators to also identify their own advertisers or advertisements, e.g., or to select brands or products that are most appropriately presented during their media programs, the systems and methods of the present disclosure may automatically match creators with targeted and relevant content that is likely to engage listeners, and enhance not only a listener's affinity for brands or products, but also the effectiveness of advertisements of such brands or products upon the listener. By obtaining a deeper understanding of media content of a media program, e.g., in real time or near-real time, creators may be more accurately or more effectively matched to brands or products, thereby enhancing experiences of listeners and revenues generated for the brands and creators.

Moreover, in some implementations, the systems and methods of the present disclosure may automatically identify and recommend media content to be included in a media program, or an adjustment to the media program, that would increase a probability that listeners will engage with advertisements that are presented during the media program, and to steer the media program in a direction that will more likely engage listeners with brands or products associated with such advertisements.

In some implementations, audio data provided by creators of media programs, by listeners or other participants in such media programs, or by other sources (e.g., advertisements, music, news, sports, weather, or other programming) during such media programs or after such media programs have aired, is subjected to both text transcription and audio analysis, and acoustic features such as sentiments, meanings, tones (or tenors), genres, topics or others are identified from the audio data. Furthermore, acoustic characteristics of the media programs such as frequencies, intensities, speech rates, patterns or others may also be identified. Media content (e.g., words that are spoken or sung by participants) of a media program that is processed to identify text or acoustic features may be used, along with metadata regarding the media program (e.g., text-based descriptions of the media programs, viewer ratings or descriptors, an identifier of the creator, identifiers of media programs, identifiers of listeners to the media programs, or others) and any other features that are historically associated with a creator, in order to classify the creator, such as by generating an embedding, a vector, or another representation or classification of the creator. Likewise, media content of advertisements for a brand, or for products of the brand, that is processed to identify keywords or acoustic features representative of the brand may be used, along with features that are specific to the brand, and feedback received from customers regarding the brand, in order to classify the brand, such as by generating an embedding, a vector, or another representation or classification of the brand.

When a creator of a media program and a plurality of brands have been classified according to implementations of the present disclosure, one of the brands may be identified as most closely matching the creator based on such classifications, and an advertisement for the brand (or for a product of the brand) that may be expected to generate high engagement, or which may be particularly suited to the creator, may be identified. As necessary, an advertisement (e.g., a set of text, a clip or other set of media content, or others) for a brand or a product of the brand may be selected and presented to a creator. Moreover, a set of words that, if spoken or sung, may result in subjects or sentiments of the media program that are best suited for an advertisement for a brand or a product of the brand, or may result in conditions that are most favorable for the advertisement, may be provided to the creator.

Media content received from listeners may be processed according to any algorithms, systems or techniques, including but not limited to one or more machine learning algorithms, systems or techniques, to transcribe or otherwise identify words uttered by a listener within such media content, to determine a sentiment associated with the media content, or to determine whether the words of a voice sample or an utterance are objectionable (e.g., obscene, indecent, profane or divisive).

For example, in some implementations, audio data including or representing media content may be processed by one or more natural language understanding (or "NLU") processing module, a speech recognition engine or module, or another processing module, to identify words represented in the audio data. One or more computer devices or systems may transform audio data for processing by a speech recognition engine or module, which may compare the data to one or more acoustic models, language models or other data models to recognize any words incorporated in the audio data. In some implementations, data captured by a device of the listener may be processed, e.g., by an acoustic front end, to reduce noise or divided into frames representing one or more intervals of time for which values or features representing qualities of the data, along with a vector of such values or features, may be determined, e.g., by one or more mel-frequency cepstral coefficients (or "MFCCs"), perceptual linear predictive (or "PLP") techniques, neural network feature vector techniques, linear discriminant analysis, semi-tied covariance matrices, or any other approaches known to those of skill in the art.

In some implementations, a speech recognition engine or module may further process outputs of an acoustic front end by reference to information or data stored in a speech model storage. In some other implementations, a speech recognition engine may attempt to match features, or feature vectors, to phonemes or words identified by or stored in association with one or more acoustic models, language models, or other models. In some implementations, a speech recognition engine may also compute one or more values or scores for such feature vectors based on any information, data or metadata regarding the audio data, such an acoustic score representing a likelihood that a sound represented by a group of feature vectors matches a language phoneme. An acoustic score may be further adjusted based on an extent to which sounds and/or words are heard or used in context with each other, thereby enhancing a likelihood that an output of a speech recognition module or engine will results that make sense grammatically. Such models may be general, e.g., with respect to a language, or specific with respect to a particular domain. Additionally, a speech recognition engine or module may use any number of techniques to match feature vectors to phonemes, e.g., Hidden Markov Models (or "HMM") to determine probabilities of matches between feature vectors and one or more phonemes. Speech recognition modules or engines may operate on any number of devices, including but not limited to a device that captured the audio data of a voice sample, one or more computer devices associated with a broadcast system, or a device associated with a creator. Results identified by a speech recognition module or engine may be provided to one or more other components, in the form of a single textual representation of speech included in a voice sample, a list of any number of hypotheses and respective scores, or any other representation.

In some implementations, media content, or a transcript or other written account of the media content, may be processed to determine acoustic features of the media content such as a sentiment of the media content, or one or more evaluations, attitudes, appraisals, emotions, moods or judgments represented within the media content. For example, a sentiment or opinion may be identified or classified with respect to a transcript of media content as a whole, or with respect to one or more individual portions (e.g., passages, paragraphs or sentences) of the media content. When analyzing media content or a portion thereof in order to identify a sentiment or opinion expressed therein, the media content may be bifurcated or otherwise divided into sections containing objective, fact-based statements or components, and sections containing subjective, opinion-based statements or components, the latter of which is considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment or opinion of media content may be identified broadly in terms of polarity, i.e., whether the media content is generally positive, negative or neutral, or in terms of grades or degrees. For example, media content may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, such as a sentiment regarding the economy, sports or politics.

In order to identify and obtain a sentiment from media content, a transcript or other set of text or any data or information included in the media content may be analyzed in any manner. For example, one or more machine learning algorithms or techniques may be provided to determine a sentiment from a transcript of the media content, or the media content itself, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the media content, and to identify any pertinent keywords maintained therein, which may be analyzed and associated with one or more sentiments thereof.

A topic (or a theme) may be identified from a set of words identified from utterances received from creators, listeners or other participants in a media program in any manner, e.g., by one or more topic modeling algorithms or methods such as one or more latent Dirichlet allocations, matrix factorizations, latent semantic analyses, pachinko allocation models, or others. In some implementations, a topic (or a theme) may be identified by counting words (including any known synonyms) appearing within a set of words, or defining groups of the words that best represent the set. In some implementations, a topic (or a theme) may be identified based on an extent to which words are repeated within the set of words, or a frequency with which such words appear, as well as how such words are used within individual chat messages or the set of words as a whole. A topic (or a theme) may also be identified by comparing and contrasting different portions of a set of words, e.g., portions spoken by different speakers (e.g., creators, listeners or other participants), or based on text not actually included within the set of words. A topic (or a theme) may also be identified based on any metaphors or analogies included within a set of words as a whole, as well as based on any transitions or connections between any portions of the set of words.

Additionally, in some implementations, the topic may be identified or designated by a creator, a listener or another individual, who may be prompted or encouraged to apply one or more tags or other labels indicative of a topic, or to identify a point in time during which a topic of the portion of the media content has changed. Records of such tags or labels, or times at which such tags or labels were received, may be stored and utilized to identify one or more topics associated with the portion of the media content. Alternatively, a topic (or a theme) may be identified from a set of words, on any other basis. Furthermore, a topic (or a theme) may be identified at any point in time and from any portion of media content. Topics (or themes) may be identified based on any words spoken by any participants (e.g., creators or listeners) in a media program, or based on words spoken by all of the participants in the media program. Tags or descriptions of the topics of discussion may be automatically generated, or selected by a creator or another speaker identified during the media content.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is one use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content, and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
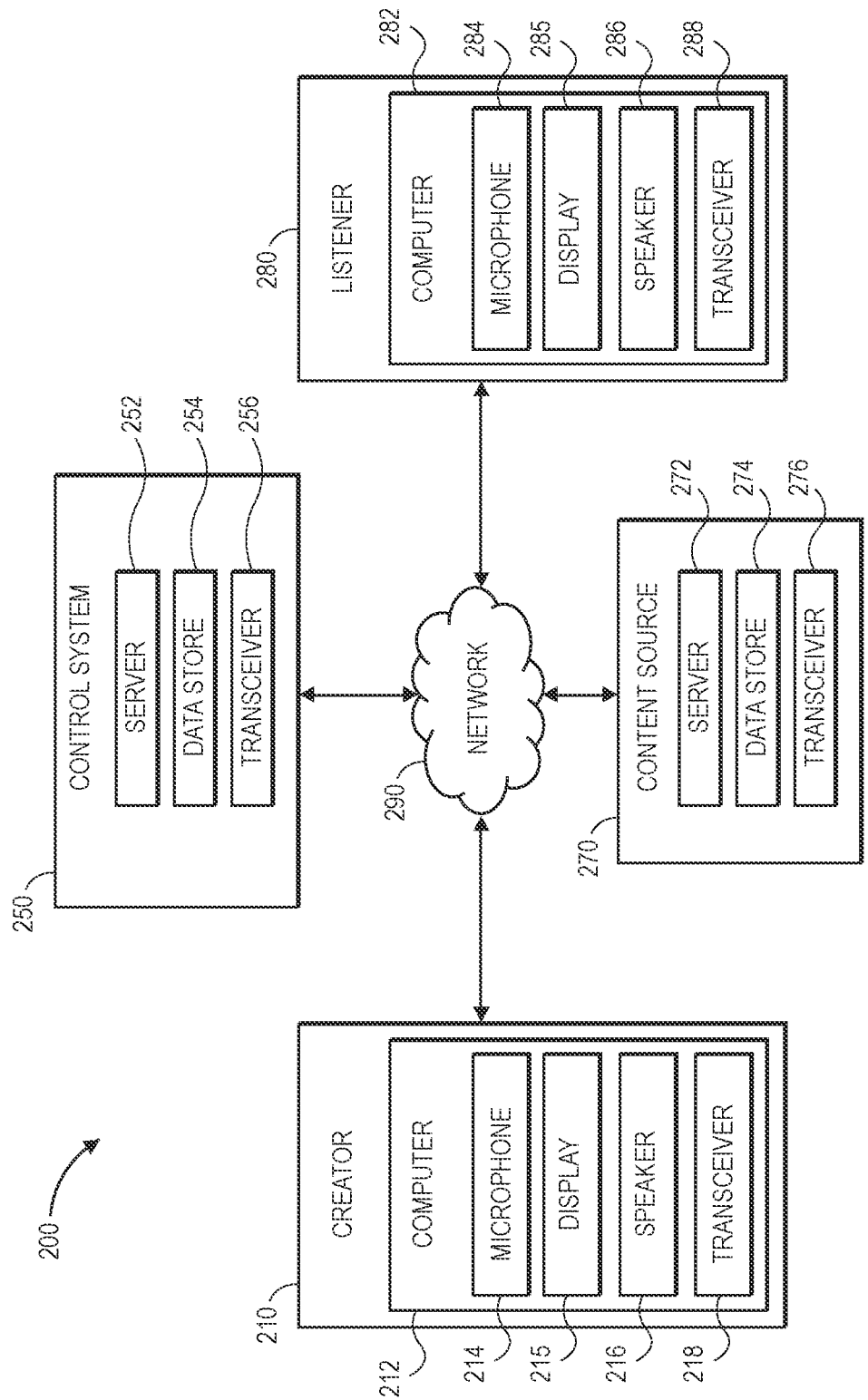
FIGS. 2A and 2B are block diagrams of components of one system for selecting advertisements for media programs, in accordance with embodiments of the present disclosure.
Figure 2B:
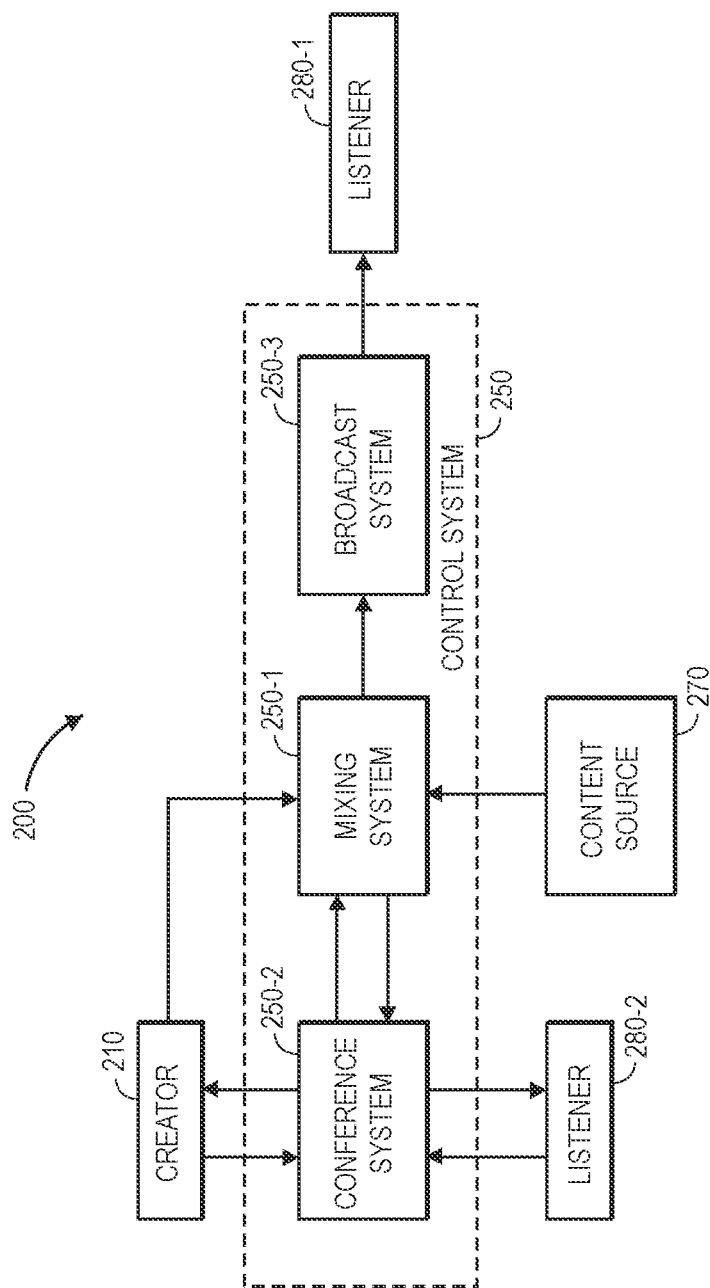

Referring to FIGS. 2A and 2B, block diagrams of components of one system 200 for selecting advertisements for media programs, in accordance with embodiments of the present disclosure, is shown. Except where otherwise noted, reference numerals preceded by the number "2" shown in FIG. 2A or FIG. 2B indicate components or features that are similar to components or features having reference numerals preceded by the number "1" shown in FIGS. 1A through 1F.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy, such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fee. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the content sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the content source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one content source 270, one listener 280, and one network 290, those of ordinary skill in the pertinent arts will recognize that any number of creators 210, broadcast systems 250, content sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the content source 270 or the listener 280 may be executed or performed by multiple systems or devices associated with each of the creator 210, the control system 250, the content source 270 or the listener 280. For example, the tasks or functions described herein as being executed or performed by the control system 250 may be performed by a single system, or by separate systems for establishing two-way connections with the creator 210 or any number of content sources 270, or any other systems, e.g., a mixing system, or for establishing one-way connections with any number of content sources 270 or any number of listeners 280 and transmitting data representing media content, e.g., a broadcast system, from such content sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized hosts, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference system 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributes or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the content source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the content source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
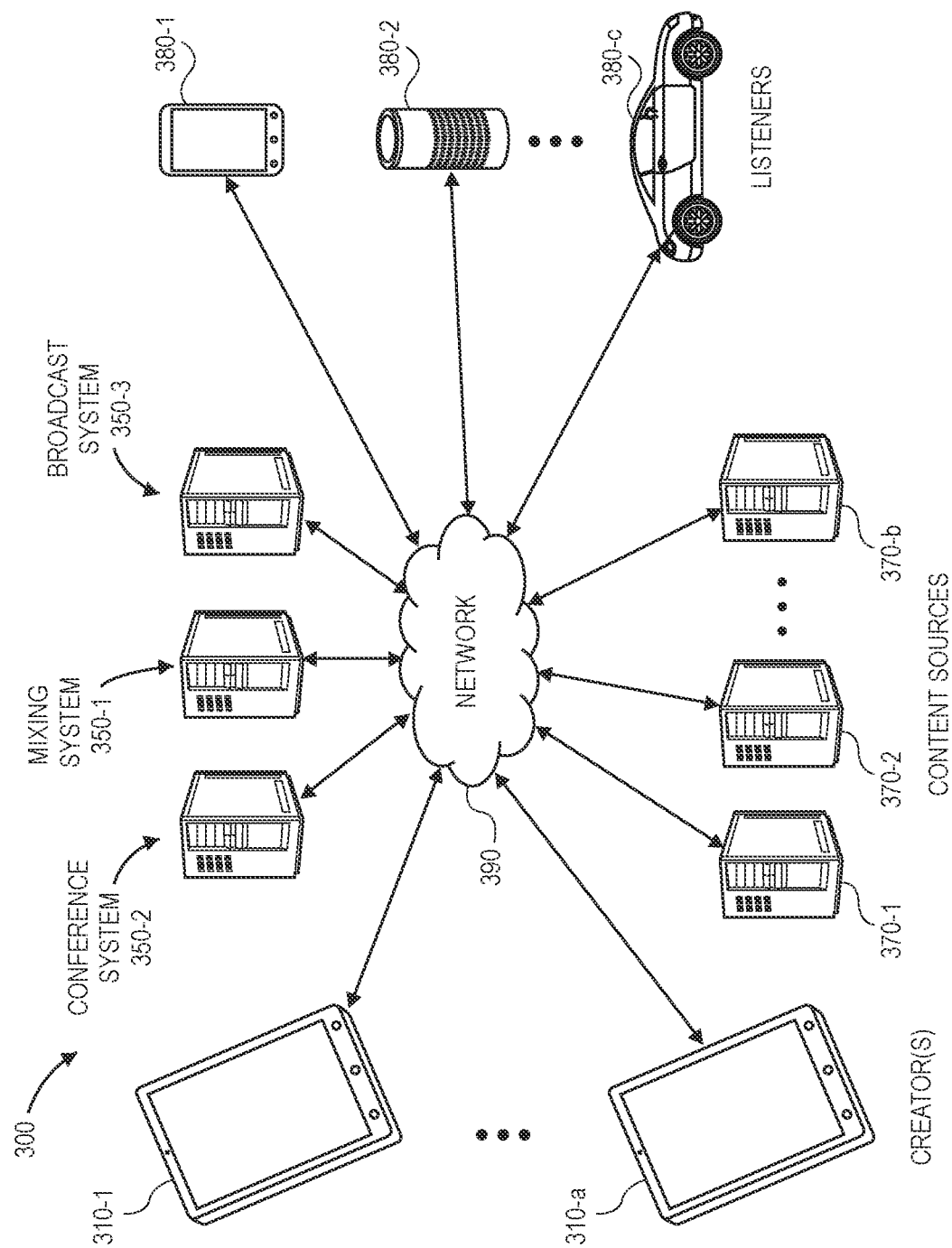
FIG. 3 is a view of aspects of one system for selecting advertisements for media programs, in accordance with embodiments of the present disclosure.

Referring to FIG. 3, a view of aspects of one system for selecting advertisements for media programs in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1F. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . .

380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

As used herein, the term "brand" may refer to any descriptor, mark, name, term, another feature that identifies items, products, goods or services from one source as distinct from other sources. As used herein, the term "product" may refer to an item, a good, a service, or any other thing or entity that may be associated with a brand and offered to customers, e.g., for purchase, rent, or borrowing, or on any other basis.

As is discussed above, one of a plurality of brands may be matched with a creator by deriving an embedding (or a vector or another representation or classification) of the creator, and deriving embeddings (or vectors or other representations or classifications) of the creator. One of the embeddings derived for the brands that most closely matches the embedding derived for the creator may be identified accordingly, and an advertisement for the brand (or for a product of the brand) for which the embedding that most closely matched the embedding of the creator was derived may be identified and presented to listeners during one or more media programs of the creator.

Figure 4:
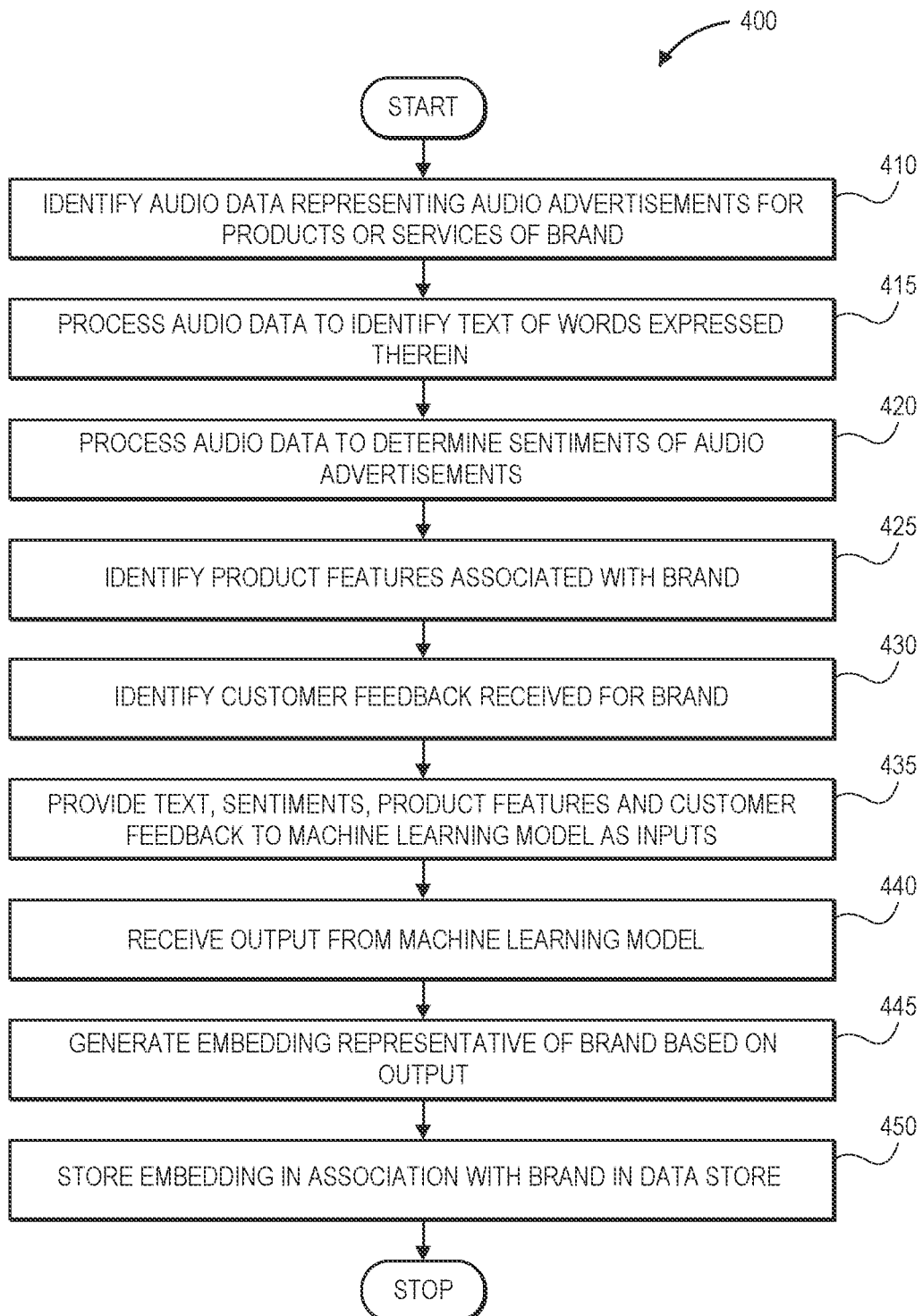
FIG. 4 is a flow chart of one process for selecting advertisements for media programs, in accordance with embodiments of the present disclosure.

Referring to FIG. 4, a flow chart 400 of one process for selecting advertisements for media programs in accordance with embodiments of the present disclosure is shown. At box 410, audio data representing audio advertisements for products or services of a brand is identified. The audio data may represent words that are spoken or sung in an advertisement, music played during the advertisement, or any other acoustic features of the advertisement. The audio data may include audio files (e.g., music, podcasts, news, or others) of any form or format, such as one or more Advanced Audio Coding ("AAC"), Audio Interchange File Format ("AIFF"), lossless audio codec, lossless encoder, Moving Picture Experts Group (or "MPEG") Audio Layer III (e.g., "MP3"), Vorbis (e.g., Ogg Vorbis), Waveform Audio File ("WAV"), Windows Media Audio ("WMA"), or other forms or formats, and at any bit rate or level of compression (e.g., 128, 192, 256 or 320 kilobits per second).

At box 415, the audio data representing the audio advertisements is processed to identify text of words expressed therein. For example, in some implementations, the audio data may be processed by one or more NLU or natural language processing ("NLP") modules, a speech recognition engine or module, or another processing module, to identify words represented in the audio data. In some implementations, the audio data representing advertisements may be processed by comparing data to one or more acoustic models, language models or other data models to recognize any words incorporated in the audio data.

At box 420, the audio data is processed to determine one or more sentiments or other acoustic features (or characteristics) of the audio advertisements. Such acoustic features may include, but need not be limited to, meanings, tones, genres, topics, emotions or other features, which may be identified using one or more machine learning models or in any other manner. In some implementations, the acoustic features may describe aspects of the sounds expressed therein, such as frequencies (e.g., average frequencies or pitches, drops or increases at ends of phrases), speech rates, intensities (e.g., sound pressure levels or loudness), or patterns of starts or stops.

At box 425, one or more product features associated with the brand are determined. For example, the product features may be specific to the brand, or may be generally or specifically associated with products of the brand, and may indicate a type or category of such products, or include any information regarding such products. The brand may be associated with any type or category of products, such as automobiles, clothing, computer software or hardware, food products, furniture, home improvement, leisure activities, photography, sporting goods, travel or any others, and the features may describe any individual attributes or features (e.g., sizes, intended uses, materials, countries of origin) or other information or data regarding products of the brand.

At box 430, customer feedback for products of the brand is identified. For example, the customer feedback may include, but need not be limited to, sets of text provided by customer regarding the brand, or one or more products of the brand. Alternatively, or additionally, the customer feedback may include, but need not be limited to, a qualitative or quantitative ratings of the brand, or of products of the brand, as rated by customers using numbers, stars or other features. The customer feedback may also include, but need not be limited to, any articles, stories, evaluations, summaries or other descriptions of the brand or of products of the brand, which may be written or otherwise generated by one or more entities that may but need not be associated with the brand.

At box 435, the text identified at box 415, the sentiments determined at box 420, the product features identified at box 425 and the customer feedback identified at box 430 are provided to a machine learning model as inputs. The machine learning model may be trained to generate an embedding, a vector, or another representation or classification of a brand based on text, sentiments, product features, feedback or any other information or data regarding the brand or any products of the brand. In some implementations, the machine learning model may be an artificial neural network, e.g., a recurrent neural network or a convolutional neural network, a transformer, e.g., a BERT model, or one or more latent Dirichlet allocations, matrix factorizations, latent semantic analyses, pachinko allocation models or others.

At box 440, an output is received from the machine learning model in response to the inputs, and at box 445, an embedding (or a vector or another representation or classification) representative of the brand is generated based on the output. The embedding may have any length or number of values, each of which may have a binary or non-binary value representative of the text, the sentiments, the product features, the customer feedback, or others. In some implementations, the embedding generated at box 445 may include a plurality of embeddings, each representative of one of the text, the sentiments, the product features, the customer feedback, or other information or data, that are so combined.

At box 450, the embedding generated at box 445 is stored in association with the brand in one or more data stores, and the process ends.

Figure 5:
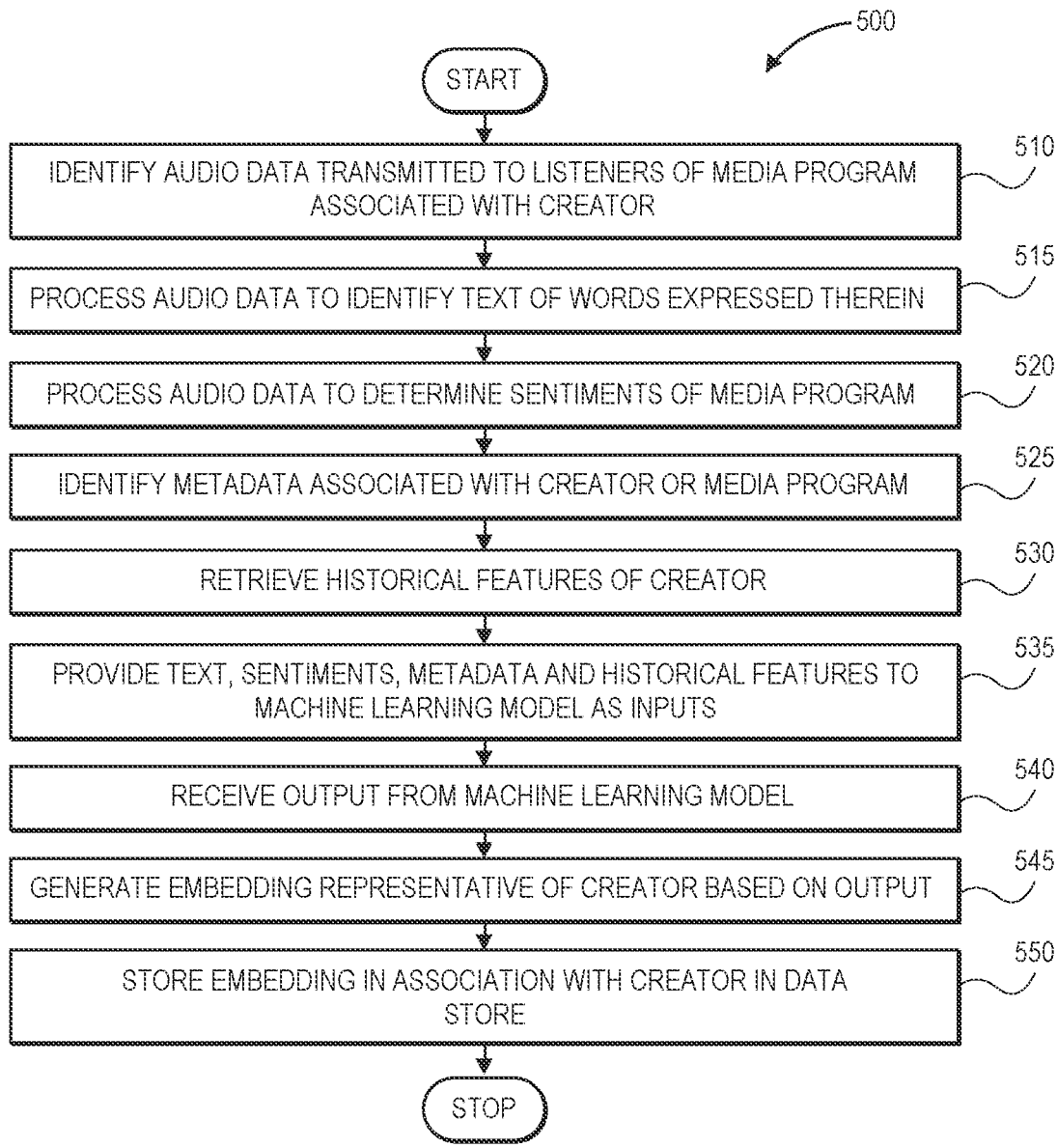
FIG. 5 is a flow chart of one process for selecting advertisements for media programs, in accordance with embodiments of the present disclosure.

Referring to FIG. 5, a flow chart 500 of one process for selecting advertisements for media programs in accordance with embodiments of the present disclosure is shown. At box 510, audio data transmitted to devices of listeners of a media program associated with a creator is identified. The audio data may represent words that are spoken or sung by the creator or by any other participant in the media program (e.g., a guest or one of the listeners to the media program), as well as any advertisements, music, news, sports, weather, or other programming or content. Additionally, the audio data may be identified in real time or in near-real time, e.g., media content streamed with the media program in progress, or at any other time, e.g., archived media content from a media program that was previously aired and has been completed. The audio data may include audio files (e.g., music, podcasts, news, or others) of any form or format, e.g., AAC, AIFF, lossless audio codec, lossless encoder, MPEG or MP3, Vorbis, WAV, WMA, or other forms or formats, and at any bit rate or level of compression (e.g., 128, 192, 256 or 320 kilobits per second).

Moreover, in some implementations, the audio data may represent all of the media content of a media program. In some other implementations, however, the audio data may represent only a portion of the media content of the media program. For example, the audio data may represent media content transmitted to devices of the listeners over an interval of time, e.g., a repeated interval of any length or duration, such as fifteen minutes, or another length or duration. Additionally, as another example, the audio data may represent media content generated by or originating from a single source, e.g., words spoken or sung by a single participant in the media program, or from all sources that contributed to the media program.

At box 515, the audio data transmitted to listeners is processed to identify text of words expressed therein, e.g., by one or more NLU or NLP modules, or other engines or modules. For example, audio data transmitted in accordance with a media program may be processed by a speech recognition engine or module, which may compare the audio data to one or more acoustic models, language models or other data models to recognize any words incorporated in the audio data.

At box 520, the audio data is processed to determine one or more sentiments or other acoustic features (or characteristics) of the media program. Such acoustic features may include, but need not be limited to, meanings, tones, genres, topics, emotions or other features. In some implementations, the acoustic features may describe aspects of the sounds expressed therein, such as frequencies (e.g., average frequencies or pitches, drops or increases at ends of phrases), speech rates, intensities (e.g., sound pressure levels or loudness), or patterns of starts or stops. In some implementations, a subject of the media program may be identified based on the text identified at box 515, e.g., by providing the text to one or more machine learning algorithms, systems or techniques, which may be trained to perform NLU, NLP, text classification, or any other models for detecting a subject.

A sentiment or an opinion of the media program, or one or more evaluations, attitudes, appraisals, emotions, moods or judgments represented within the media program, may be identified based on the text and any other acoustic features. The sentiment or the opinion may be identified or classified with respect to media content of a media program as a whole, or with respect to one or more individual portions (e.g., passages, paragraphs or sentences) of the media program. When analyzing media program, or a portion thereof, in order to identify a sentiment or opinion expressed therein, the text or acoustic features may be bifurcated or otherwise divided into sections relating to objective, fact-based statements or components, and sections relating to subjective, opinion-based statements or components, the latter of which is considered or emphasized in a sentiment analysis context. Moreover, a sentiment or an opinion may be determined by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses.

At box 525, metadata associated with the creator or the media program is identified. For example, the metadata may identify or describe one or more aspects of the media program, including but not limited to any titles, descriptions, topics, content ratings (such as for maturity or other age-based criteria), or others. At box 530, one or more historical features of the creator are retrieved, e.g., from one or more data stores. The historical features may include any other information or data regarding the creator, including but not limited to text of words expressed, acoustic features of, or metadata associated with any other media programs of the creator, or others.

At box 535, the text identified at box 515, the sentiments or other acoustic features determined at box 520, the metadata identified at box 525 and the historical features retrieved at box 530 are provided to a machine learning model as inputs, and at box 540, an output is received from the machine learning model in response to the inputs. The machine learning model may be trained to generate an embedding, a vector, or another representation or classification of a creator based on text of media programs associated with the creator, sentiments or other acoustic features of such media programs, metadata associated with such media programs, or any historical features of the creator, or any other information or data regarding the creator. In some implementations, the machine learning model may be an artificial neural network, e.g., a recurrent neural network or a convolutional neural network, a transformer, e.g., a BERT model, or one or more latent Dirichlet allocations, matrix factorizations, latent semantic analyses, pachinko allocation models or others.

At box 545, an embedding (or a vector or another representation or classification) representative of the creator is generated based on the output. The embedding may have any length or number of values, each of which may have binary or non-binary value representative of the text, the sentiments, the metadata, the historical features, or others. In some implementations, the embedding generated at box 545 may include a plurality of embeddings, each representative of one of the text, the sentiments, the metadata, the historical features, or other information or data, that are so combined.

At box 550, the embedding generated at box 545 is stored in association with the creator in one or more data stores, and the process ends.

Figure 6:
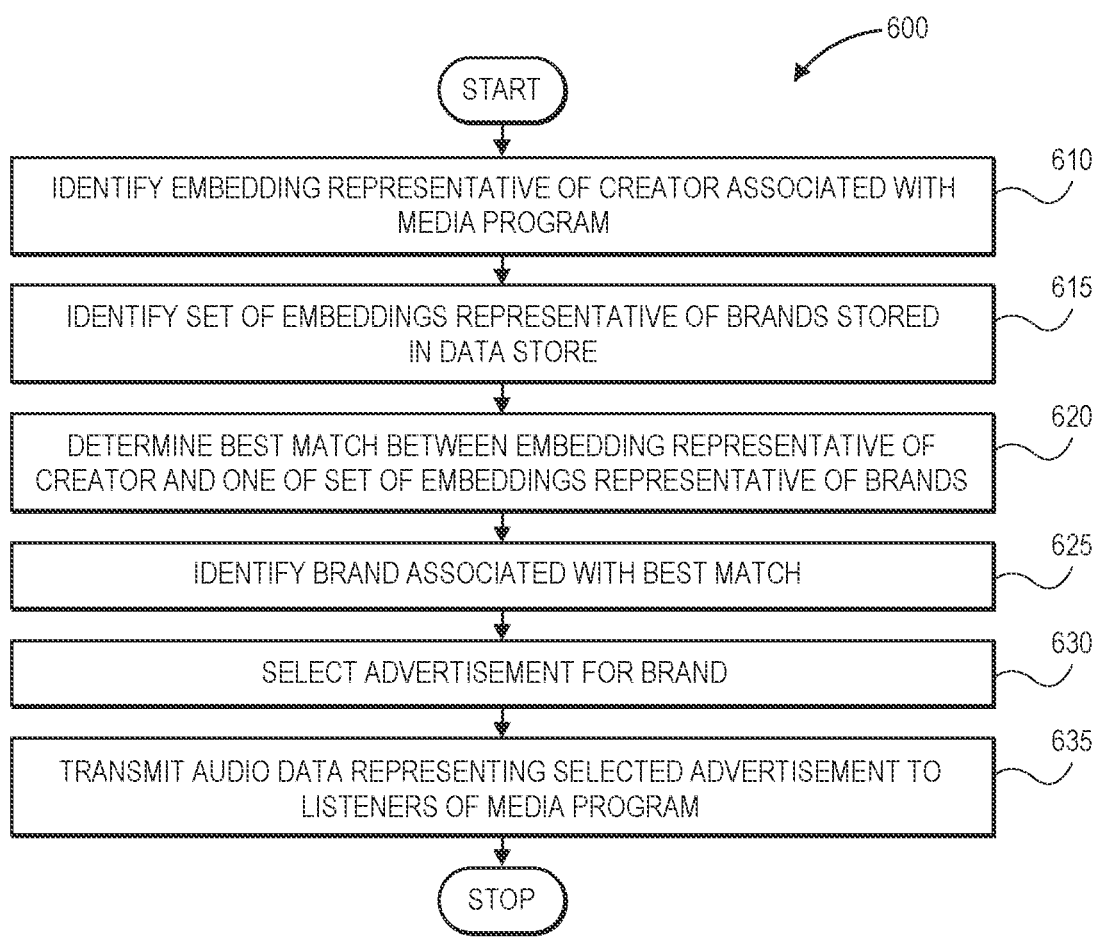
FIG. 6 is a flow chart of one process for selecting advertisements for media programs, in accordance with embodiments of the present disclosure.

Referring to FIG. 6, a flow chart 600 of one process for selecting advertisements for media programs in accordance with embodiments of the present disclosure is shown. At box 610, an embedding representative of a creator associated with a media program is identified. For example, the embedding may be stored in associated with a control system, a mobile device of the creator, or any other device or system.

At box 615, a set of embeddings (or vectors or other representations or classifications) representative of brands stored in one or more data stores are identified. The embeddings may be stored on data stores of a control system, local to a computer device or system that generated the embeddings, or remote from the control system or the computer device or system that generate the embeddings, such as in one or more alternate or virtual locations, e.g., in a "cloud"-based environment. Each of the embeddings may have been generated according to a process similar to that of the flow chart 400 of FIG. 4, or according to any other processes.

At box 620, a best match between an embedding representative of the creator and one of the set of embeddings representative of the brands identified at box 610 is determined. The best match between such embeddings may be determined in any manner, such as based on dot products of the embedding representative of the creator and the set of embeddings representative of the brands, with the best match being identified as a dot product having the greatest value.

At box 625, the brand associated with the best match determined at box 620 is identified. The brand associated with the best match may be the brand for which the embedding that constitutes the best match with the embedding representative of the creator was derived. Alternatively, the brand associated with the best match may be identified in any other manner.

At box 630, an advertisement is selected for the brand identified at box 625. The advertisement may be selected in any manner. For example, where a plurality of advertisements for the brand, or for products of the brand, are stored in one or more data stores, the selected advertisement may have one or more acoustic features in common with one or more acoustic features of the media program. Alternatively, or additionally, the selected advertisement may be identified based on information or data regarding listeners to the media program, and may be an advertisement having a greatest affinity or association with one or more of such listeners. For example, text or acoustic features of one or more advertisements of the brand associated with the advertisements may be matched with the text or acoustic features of the media program and selected accordingly.

At box 635, audio data representing the selected advertisement is transmitted to devices of listeners to the media program, and the process ends. In some implementations, a creator of the media program may be provided with a set of words that is to be spoken or sung by the creator or another participant during the media program. In some other implementations, the creator may be provided with media content representing the selected advertisement that is to be played during the media program, e.g., automatically or at the direction of the creator. In still other implementations, information regarding the selected advertisement may be provided to the creator in any other manner.

Alternatively, in some implementations, the creator may be permitted to accept or reject a recommendation of an advertisement or a brand, such as by one or more interactions with a user interface, or in any other manner. In such implementations, the creator may be permitted to exercise ultimate control over advertisements, brands or products that are associated with the creator or the media program.

Embeddings (or vectors or other representations or classifications) of a creator and corresponding embeddings of brands may be generated and compared to one another to determine which of the brands is a best match for a creator by providing data representing the creator and each of the brands to a single, multi-tower (e.g., a two-tower) machine learning model having separate sets of layers. For example, a machine learning model may include one encoder (e.g., one artificial neural network), or one tower, that is configured to receive inputs such as words included in media content of a media program associated with a creator, sentiments of the media content, metadata regarding the media program, historical features of the creator or others, and another encoder (e.g., another artificial neural network), or another tower, that is configured to receive inputs such as words included in advertisements for the brand or products of the brand, sentiments of the advertisements, features of the brand or products of the brand, any feedback or others regarding a brand. The machine learning model may be further configured to derive an embedding representative of a creator, e.g., by one encoder or tower, and an embedding representative of the brand, e.g., by the other encoder or tower, and to determine an extent to which the brand is a match for the creator in a single output.

Referring to FIGS. 7A through 7F, views of aspects of one system for selecting advertisements for media programs in accordance with embodiments of the present disclosure are shown. Except where otherwise noted, reference numerals preceded by the number "7" shown in FIGS. 7A through 7F indicate components or features that are similar to components or features having reference numerals preceded by the number "3" shown in FIG. 3, by the number "2" shown in FIG. 2A or 2B, or by the number "1" shown in FIGS. 1A through 1F.

Figure 7A:
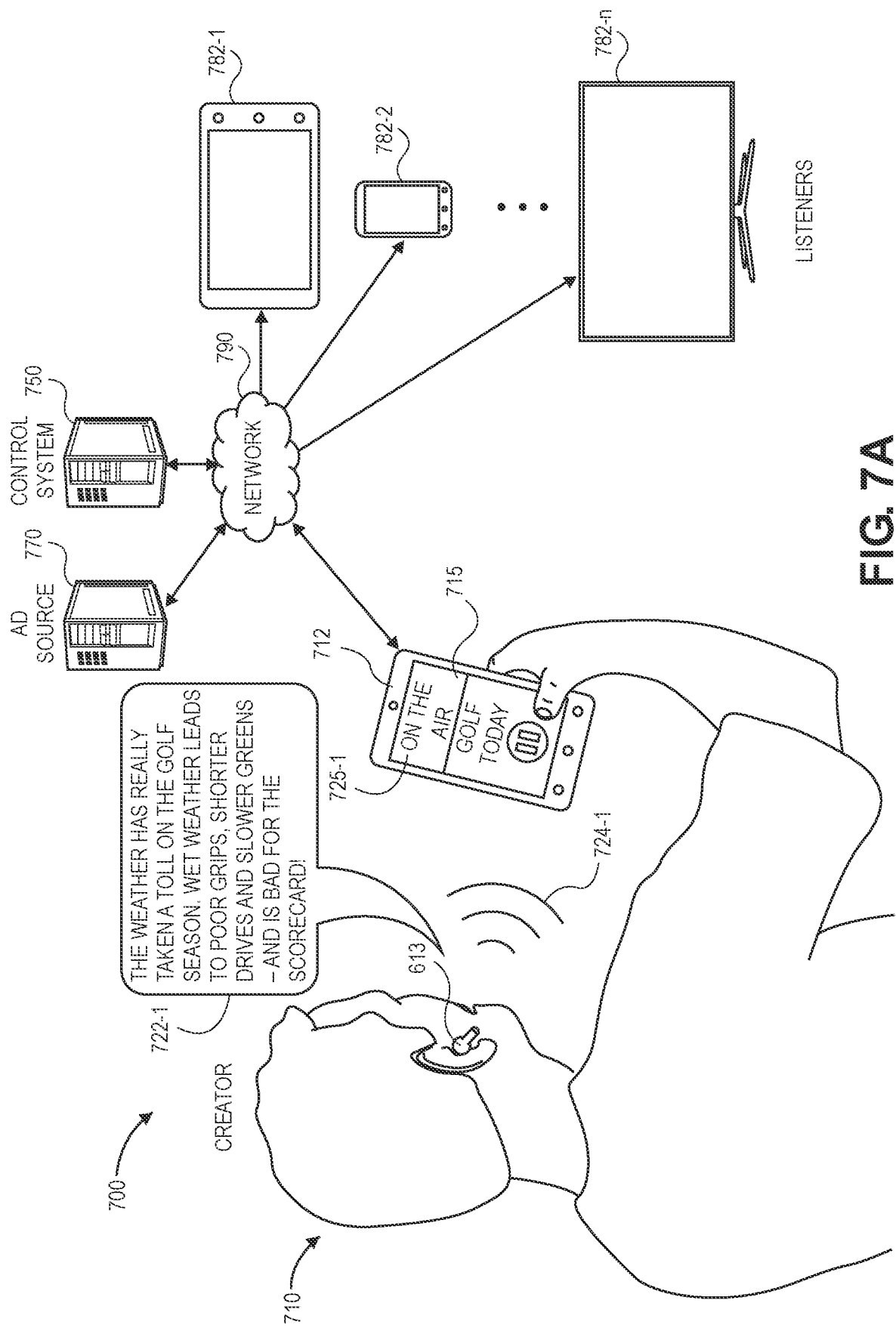
FIGS. 7A through 7F are views of aspects of one system for selecting advertisements for media programs, in accordance with embodiments of the present disclosure.

As is shown in FIG. 7A, a system 700 includes a mobile device 712 of a creator 710, a control system 750, an advertisement source 770, and a plurality of computer devices 782-1, 782-2 . . . 782-n or other systems of any number of listeners (or viewers) that are connected to one another over one or more networks 790, which may include the Internet in whole or in part. The creator 710 wears one or more ear buds 713 (or earphones, or headphones) or other communication systems or devices which may be in communication with the mobile device 712, and may exchange (e.g., transfer or receive) data relating to audio signals or any other data with the mobile device 712. As is shown in FIG. 7A, the mobile device 712 includes a display 715 (e.g., a touchscreen) having a user interface 725-1 rendered thereon. The user interface 725-1 identifies a title or a theme of a media program, viz., "Golf Today," and may include one or more interactive or selectable elements or features that enable the creator 710 to control the transmission or receipt of media content in accordance with the media program.

As is further shown in FIG. 7A, the creator 710 provides an utterance 722-1 of one or more words that are intended to be heard by one or more listeners using the computer devices 782-1, 782-2 . . . 782-n. The utterance 722-1 is consistent with the title or the theme of the media program, viz., "The weather has really taken a toll on the golf season. Wet weather leads to poor grips, shorter drives and slower greens—and is bad for the scorecard!" The mobile device 712 and/or the ear buds 713 may capture audio data 724-1 representing the utterance 722-1 of the creator 710, and transmit the data 724-1 to the control system 750 over the one or more networks 790. The control system 750 may then cause data representing at least the utterance 722-1, e.g., at least some of the data 724-1, to be transmitted over the one or more networks 790 to the computer devices 782-1, 782-2 . . . 782-n.

Figure 7B:
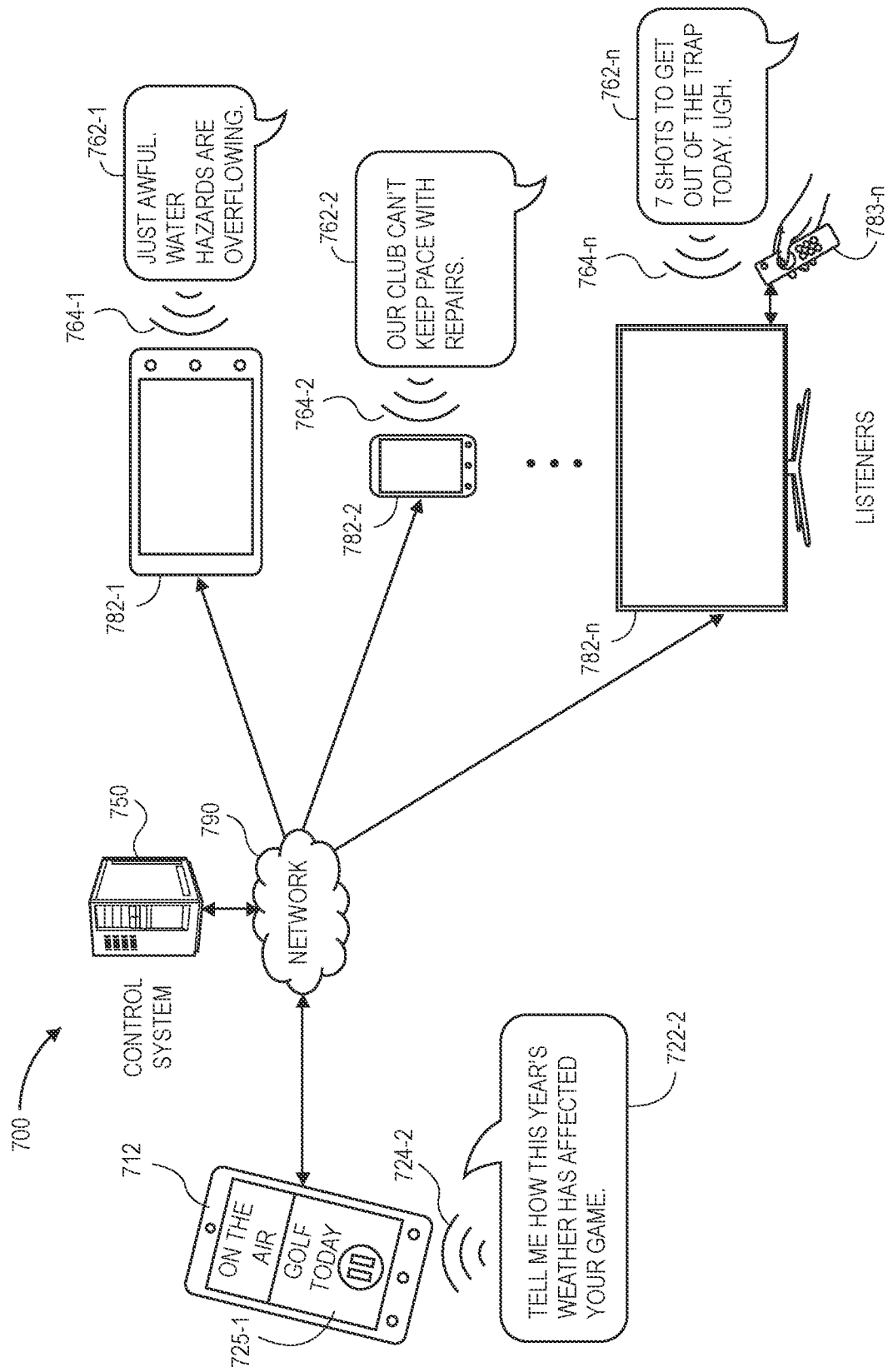

As is shown in FIG. 7B, the creator 710 provides another utterance 722-2 in accordance with the theme of the media program, viz., "Tell me how this year's weather has affected your game," and invites one or more listeners to participate in the media program. The mobile device 712 and/or the ear buds 713 capture audio data 724-2 representing the utterance 722-2, and transmit the data 724-2 to the control system 750 over the one or more networks 790.

In reply, a listener using the device 782-1 provides an utterance 762-1, viz., "Just awful. Water hazards are overflowing." A listener using the device 782-2 provides an utterance 762-2, viz., "Our club can't keep pace with repairs." A listener using the device 782-n or an auxiliary device 783-n (e.g., a voice-enabled remote control) associated with the device 782-n provides an utterance 762-n, viz., "7 shots to get out of the trap today. Ugh." The respective devices 782-1, 782-2 . . . 782-n capture data 764-1, 764-2 . . . 764-n representing the utterances 762-1, 762-2 . . . 762-n, and transmit the data 764-1, 764-2 . . . 764-n to the control system 750 over the one or more networks 790. The control system 750 may then provide information regarding the utterances 762-1, 762-2 . . . 762-n to the creator 710, e.g., by way of the mobile device 712, or cause data representing the utterances 762-1, 762-2 . . . 762-n, e.g., some or all of the data 724-2 or the data 764-1, 764-2 . . . 764-n and any other information, data or metadata, to be transmitted to the device 712 or one or more of the devices 782-1, 782-2 . . . 782-n over the one or more networks 790.

Figure 7C:
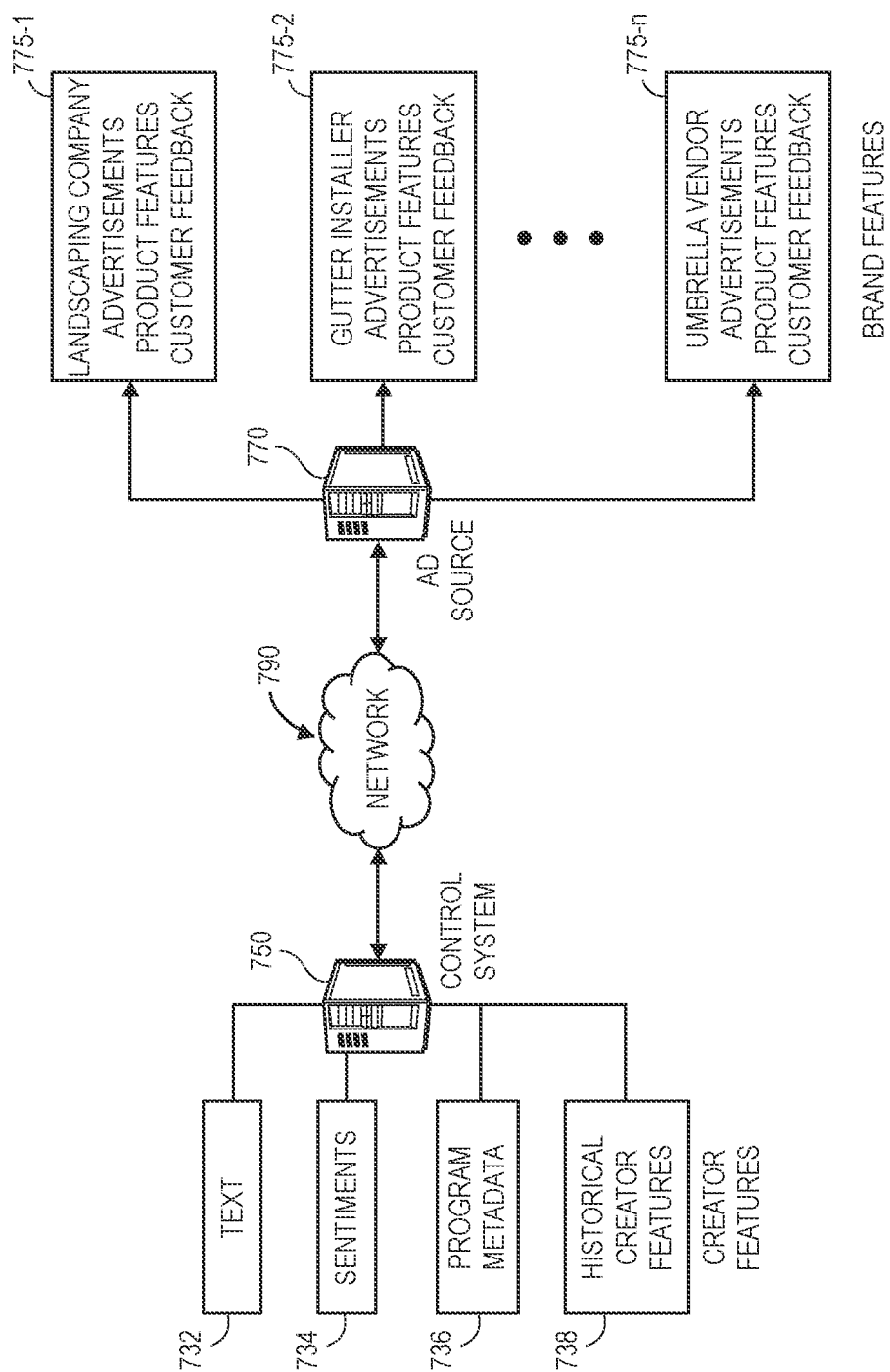

As is shown in FIG. 7C, the control system 750 may process media content associated with the media program to determine information or data that may be associated with the creator 710, including a set of text 732 or one or more sentiments 734 (or other acoustic features, such as opinions, meanings, tone, genres, topics or others) expressed in the media content. For example, the set of text 732 may include some or all words included in the utterances 722-1, 722-2, 762-1, 762-2 . . . 762-n, e.g., by providing some or all of the data 724-1, 724-2, 764-1, 764-2 . . . 764-n to one or more NLU or NLP modules, speech recognition engines or modules, or other processing modules, to identify words represented in the audio data. The sentiments 734 may be identified based on the set of text 732, or any of the utterances 722-1, 722-2, 762-1, 762-2 . . . 762-n or the data 724-1, 724-2, 764-1, 764-2 . . . 764-n, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, or others.

As is further shown in FIG. 7C, the control system 750 may identify or retrieve metadata 736 of the media program, as well as one or more historical features 738 regarding the creator 710, e.g., text, sentiments or other metadata associated with other episodes of the media program, or other media programs. Likewise, the control system 750 may identify or retrieve information or data regarding a plurality of brands 775-1, 775-2 . . . 775-n, which may be stored on an advertisement source 770 or any other device or system (not shown). For example, the information or data regarding the brand 775-1 (viz., a landscaping company), the brand 775-2 (viz., a gutter installer) and the brand 775-*n* (viz., an umbrella vendor) may include advertisements for the brands or products of the brands, features of products of the brands, feedback from customers associated with the brands, or any other information or data.

Figure 7D:
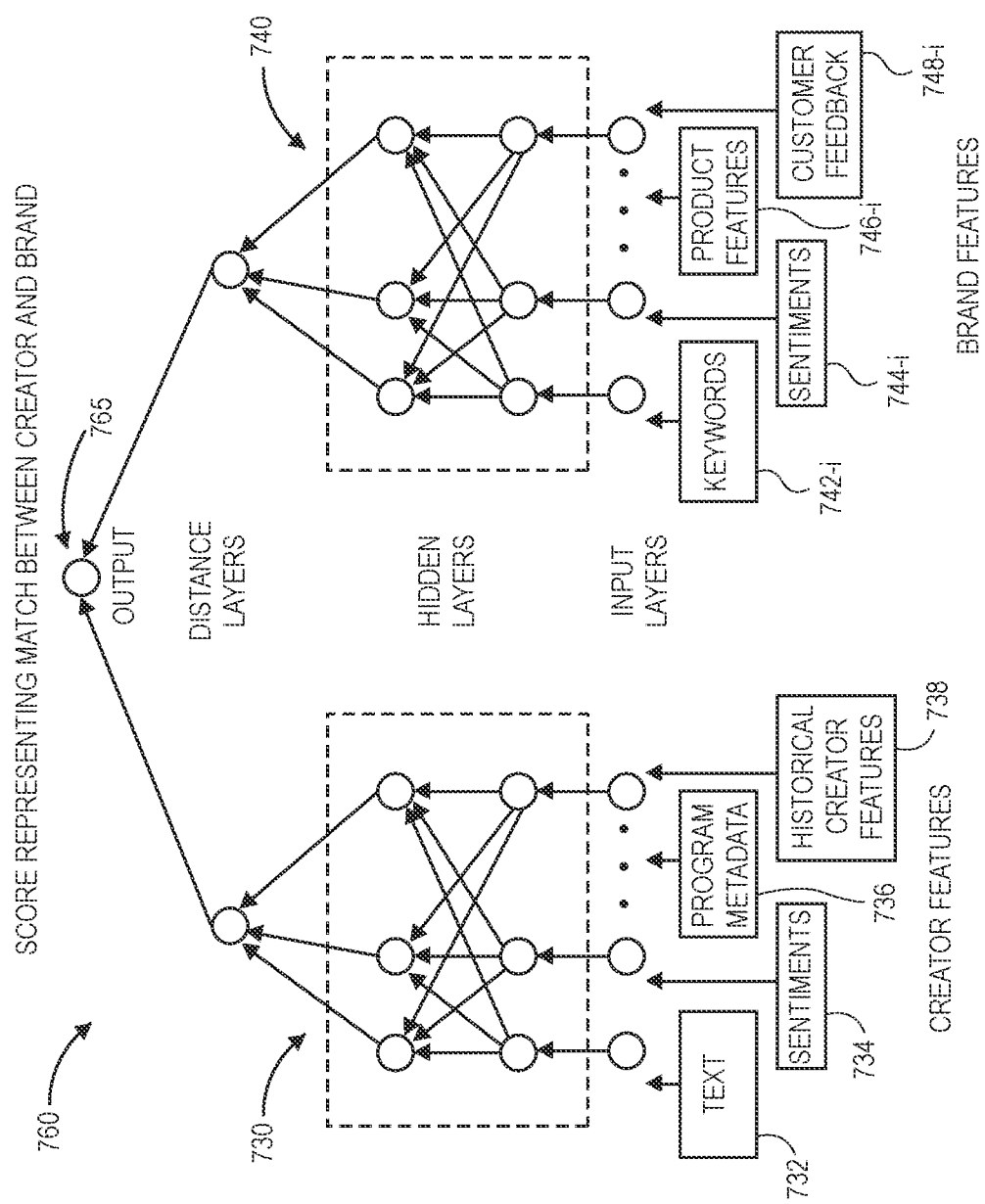

As is shown in FIG. 7D, information or data regarding the creator 710 and respective ones of the brands may be provided as inputs to a machine learning model 760 (e.g., a multi-tower model) having a creator encoder 730 (e.g., a first artificial neural network) and a brand encoder 740 (e.g., a second artificial neural network). The machine learning model 760 may be executed or operated by the control system 750 or any other computer device or system (not shown).

As is shown in FIG. 7D, the machine learning model 760 may include a pair of input layers to each of the creator encoder 730 and the brand encoder 740, respectively, as well as a pair of sets of middle layers of each of the creator encoder 730 and the brand encoder 740, respectively. Additionally, as is further shown in FIG. 7D, the machine learning model 760 may include a pair of distance layers from each of the creator encoder 730 and the brand encoder 740, respectively, and a single output layer (or output node) configured to generate an output 765 in the form of a score representing a match between a creator and a brand.

The machine learning model 760 of FIG. 7D may be configured to receive the set of text 732, the sentiments 734, the metadata 736, and the historical features 738 of the creator 710, or any other information or data as inputs to the creator encoder 730. Additionally, the machine learning model 760 of FIG. 7D may also be configured to receive, for each of the brands 775-1, 775-2 . . . 775-*n*, a set of keywords 742-*i* associated with advertisements for one of the brands 775-1, 775-2 . . . 775-*n* (or products of the one of the brands 775-1, 775-2 . . . 775-*n*), as well as sentiments 744-*i* of such advertisements, features 746-*i* of products of the one of the brands 775-1, 775-2 . . . 775-*n*, and any feedback 748-*i* received from customers regarding the one of the brands 775-1, 775-2 . . . 775-*n*, as inputs to the brand encoder 740.

The machine learning model 760 may be trained to derive or otherwise generate a creator embedding, or a vector or another representation or classification of the creator 710, e.g., as an output of the creator encoder 730 prior to a distance layer, e.g., by a last output layer of each of the creator encoder 730 and the brand encoder 740. The creator embedding may be derived or generated based on the inputs, viz., the set of text 732, the sentiments 734, the metadata 736, and the historical features 738, or any other information or data, in accordance with the present disclosure. Likewise, the machine learning model 760 may be trained to derive or otherwise generate a brand embedding, or a vector or another representation or classification of one of the brands 775-1, 775-2 . . . 775-*n*, e.g., as an output of the brand encoder 740 at a distance layer. The brand embedding may be derived or generated based on the inputs, viz., the keywords 742-*i*, the sentiments 744-*i*, the features 746-*i*, the feedback 748-*i* or any other information or data for one of the brands 775-1, 775-2 . . . 775-*n*, in accordance with the present disclosure.

Additionally, the machine learning model 760 may generate the output 765 based on the creator embedding derived by the creator encoder 730 and the brand embedding derived by the brand encoder 740 for one of the brands 775-1, 775-2 . . . 775-*n*. In some implementations, the machine learning model 760 may calculate the output 765 as a dot product (or a cross product or a vector product) of the creator embedding derived by the creator encoder 730 and the brand embedding derived by the brand encoder 740, executed at the distance layers of the creator encoder 730 and the brand encoder 740.

The output 765 may include a score representative of a match between a creator embedding derived by the creator encoder 730 and a brand embedding derived by the brand encoder 740, and thus a match between the creator 710 and one of the brands 775-1, 775-2 . . . 775-*n*. The score may have any value or range, such as between zero and one, where a value of zero corresponds to a poor match (or not a match), and a value of one corresponds to a good match (or a perfect match). Where the score is sufficiently high, the creator 710 and the one of the brands 775-1, 775-2 . . . 775-*n* may be deemed to be a good match, and an advertisement associated with the one of the brands 775-1, 775-2 . . . 775-*n* or a product thereof may be identified and presented to listeners of the media program. Where the score is sufficiently low, however, the creator 710 and the one of the brands 775-1, 775-2 . . . 775-*n* may be deemed to not be a good match. In some implementations, the one of the brands 775-1, 775-2 . . . 775-*n* having the highest score is selected as the best match for the creator 710.

After one of the brands 775-1, 775-2 . . . 775-*n*, viz., the brand 775-2, has been selected based on the output 765 generated from the creator embedding and a brand embedding derived for that brand, an advertisement for the brand 775-2, or for a product of the brand 775-2, may be selected and presented to listeners of the media program by way of the devices 782-1, 782-2 . . . 782-*n*. As is shown in FIG. 7E, one or more advertisements for the brand 775-2 that are stored in an advertisement source 770 may be identified and evaluated for suitability for their inclusion in the media program, e.g., by comparing content of the one or more advertisements to the keywords 742-*i*, the sentiments 744-*i*, the features 746-*i*, the feedback 748-*i* or any other information or data regarding the brand 775-2.

Figure 7E:
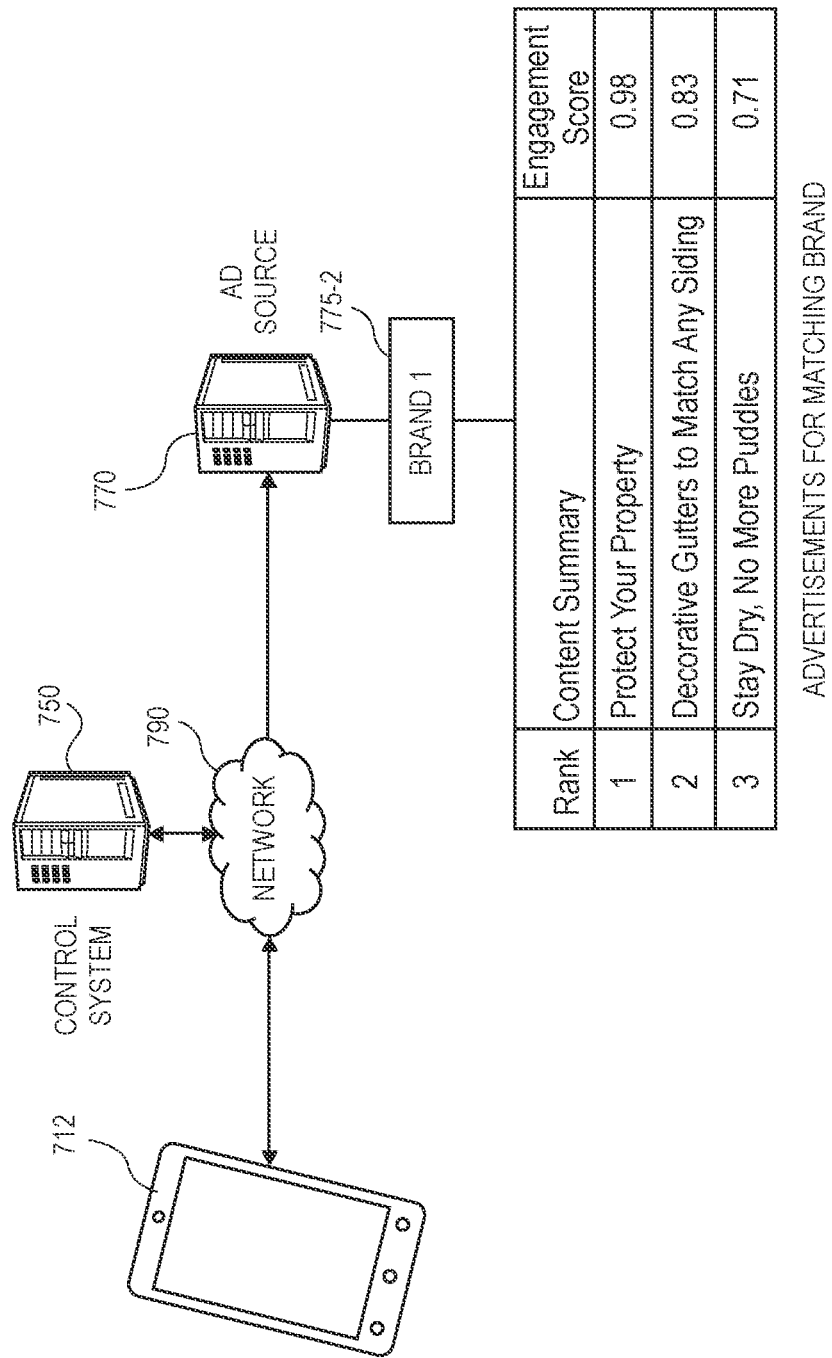

For example, as is shown in FIG. 7E, the advertisements for the brand 775-2 are identified by keywords representative of their content, and ranked based on their projected levels of engagement, e.g., a value of an engagement score, which may be determined or calculated on any basis, such as historical returns or any other actual or predicted measures of relevance in general or specifically with regard to media programs of the creator 710.

For example, one advertisement for the brand 775-2 is entitled "Protect Your Property" and has an engagement score of 0.98. Another advertisement for the brand 775-2 is entitled "Decorative Gutters to Match Any Siding," and has an engagement score of 0.83. Yet another advertisement for the brand 775-2 is entitled "Stay Dry, No More Puddles," and has an engagement score of 0.71. An engagement score of an advertisement may be calculated on any basis, and may indicate or represent an affinity between content of an advertisement, e.g., property protection, decoration, or inhibiting puddles, and content of the media program.

Figure 7F:
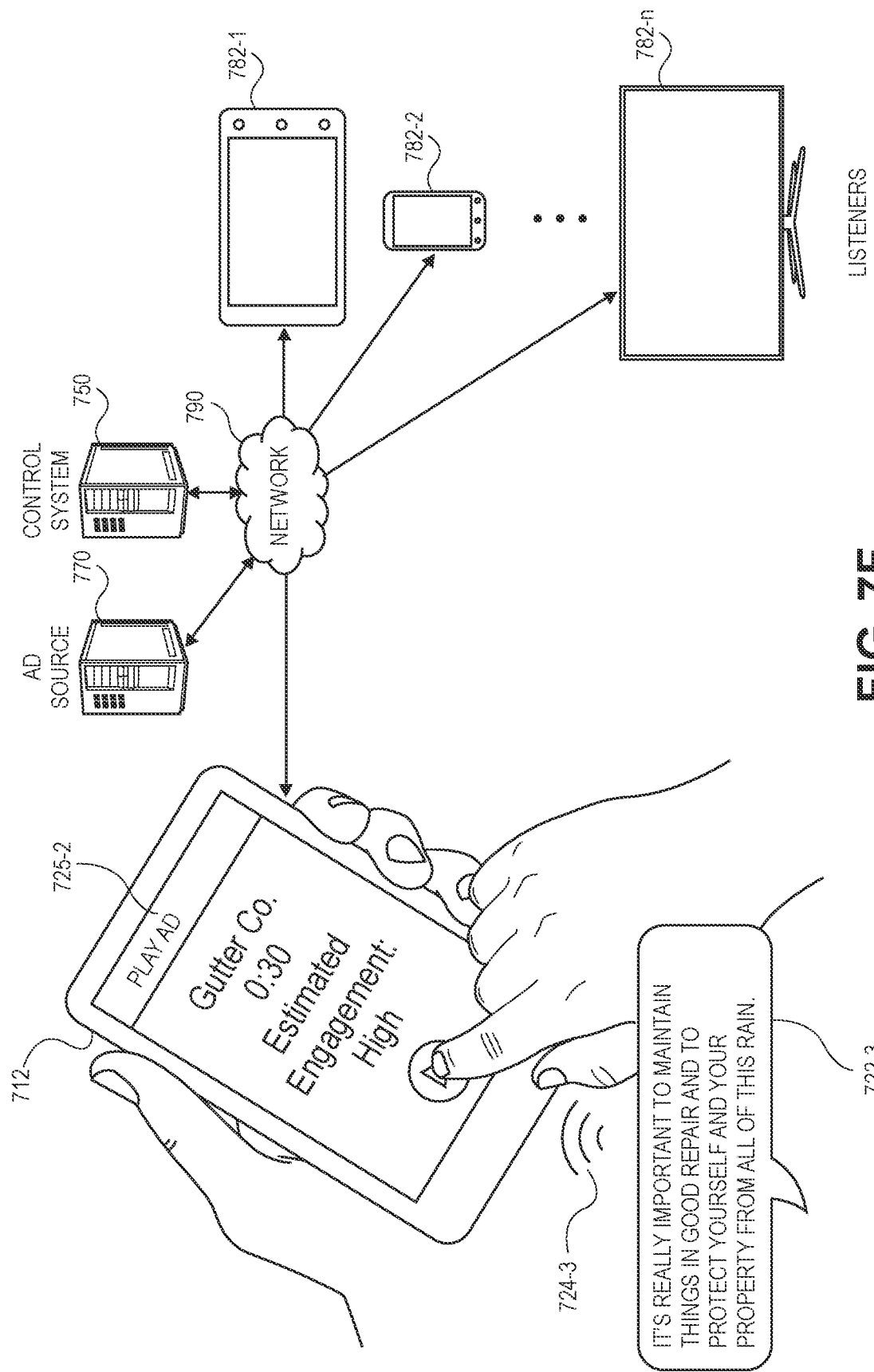

As is shown in FIG. 7F, upon identifying the advertisement for the brand 775-2, information regarding the advertisement is transmitted to the mobile device 712, e.g., by the control system 750 or the advertisement source 770, and rendered in a user interface 725-2 on the display 715. The user interface 725-2 identifies the brand 775-2 associated with the advertisement, viz., the gutter installer and repairer, as well as the duration of the advertisement, and an estimated level of engagement, which may be determined based on a similarity of the advertisement to content of the media program, or in any other manner. The user interface 725-2 further includes a button or another element that, when selected, causes a one-way or unidirectional channel or connection to be established between the advertisement source 770 and the media system 750, and causes data for presenting the advertisement to be transmitted to the devices 782-1, 782-2 . . . 782-*n*.

Additionally, as is also shown in FIG. 7F, the creator 710 provides another utterance 722-3 consistent with the theme of the media program, viz., "It's really important to maintain things in good repair, and to protect yourself and your property from all of this rain." One or more words of the utterance 722-3 may be selected based on the content of the advertisement for the brand 775-2, such as to establish conditions for optimizing the engagement of listeners to the media program with the advertisement for the brand 775-2.

Although FIG. 7C includes only three boxes corresponding to the brands 775-1, 775-2 . . . 775-*n*, those of ordinary skill in the pertinent arts will recognize that embeddings (or vectors, representations or classifications) of any number of brands may be compared to an embedding (or a vector, a representation or a classification) of a creator in order to determine which of such brands is a best match with the creator. Likewise, although the machine learning model 760 of FIG. 7D includes only a pair of encoders (or towers) 730, 740 from which an output 765 may be determined, those of ordinary skill in the pertinent arts will recognize that machine learning models may include any number of such encoders or towers (e.g., three or more), and may consider any number of embeddings (or vectors, representations or classifications), such as an embedding of an individual advertisement of a brand or an embedding of an individual listener to a media program of a creator, when attempting to match the brand to the creator, in accordance with implementations of the present disclosure.

Furthermore, in some implementations, the systems and methods of the present disclosure may identify a brand that is a best match for a creator, determine attributes of an advertisement for the brand, and identify a desired subject of a media program of the creator, or a desired sentiment of the media program, that would be consistent with the attributes of the advertisement and would enhance a level of engagement between the advertisement and listeners to the media program. Accordingly, a subject or a sentiment of a media program that is in progress may be determined, and additional text, acoustic features or other information or data that are required in order to cause the media program to have the desired subject or the desired sentiment may be identified. The additional text, acoustic features or other information or data may be provided to the creator in any manner, and the creator may be encouraged or recommended to cause such additional text or acoustic features to be incorporated into the media program.

Figure 8:
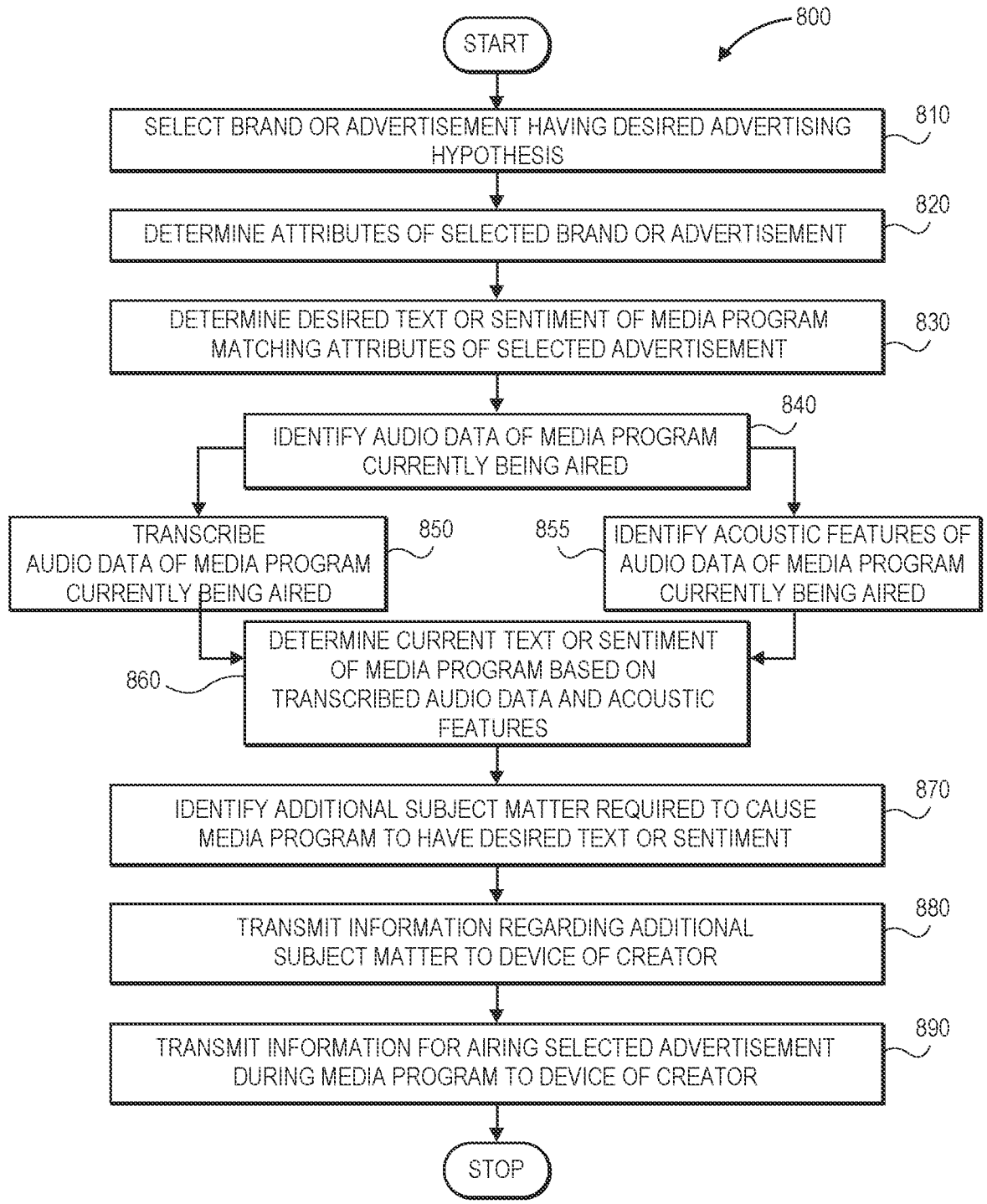
FIG. 8 is a flow chart of one process for selecting advertisements for media programs, in accordance with embodiments of the present disclosure.

Referring to FIG. 8, a flow chart 800 of one process for selecting advertisements for media programs in accordance with embodiments of the present disclosure is shown. At box 810, a brand or an advertisement having a desired advertising hypothesis is selected. For example, the advertising hypothesis may be a predicted or anticipated level of engagement or return, or may represent a brand or a product of the brand for which a desired level of demand is not met. The advertisement hypothesis may also identify a preferred length or duration for advertisements that may be accommodated in a specific time slot, or a specific time of day or location for which an advertisement may be targeted.

At box 820, one or more attributes of the selected brand or advertisement are identified. In some implementations, the attributes may include, but need not be limited to, words spoken or sung during advertisements for the brand, images or video displayed during the advertisements, or any attributes of the brand or any product represented in the advertisement, e.g., a type, a category, a name, a description, an intended buyer or an intended use of the product.

At box 830, a desired text of a media program and a desired sentiment of the media program that match attributes of the selected brand or advertisement are determined. In some implementations, the desired text or the desired sentiment may relate directly or indirectly to the attributes of the selected brand or advertisement. The desired text may include or relate to words that are preferably spoken or sung during a media program that involves a creator or one or more other participants, or a preferred topic of the media program. The desired sentiment may relate to a feeling or an emotion that the creator or the other participants preferably experience in response to what is being spoken or sung during the media program. In some implementations, the desired text may include one or more of the same words as one or more advertisements for the brand, or words that relate to such advertisements, while the desired sentiment may relate to a desired feeling or a response to such words that relate to the selected advertisement. For example, where a selected advertisement relates to a brand of lawn mowers, a desired set of text may relate to lawns, e.g., fertilizers, pest or weed control, or games or activities that commonly occur on lawns, while a desired sentiment may relate to a positive sentiment or emotion toward properly caring for lawns, or a negative sentiment or emotion toward the adverse effects of failing to properly care for lawns.

At box 840, audio data of a media program that is currently being aired is identified. For example, the audio data may represent words that are spoken or sung by any participants in the media program, or any advertisements, music, news, sports, weather, or other programming or content. Additionally, the audio data may be identified in real time or in near-real time, or at any other time, and may represent all of the media content of a media program, or only a portion of the media content of the media program, and may be received from or transmitted by any number of sources.

At box 850, the audio data of the media program currently being aired is transcribed, e.g., by one or more machine learning algorithms, systems or techniques, or in any other manner. In parallel, at box 855, acoustic features of the media program currently being aired are identified. For example, the audio data may be transcribed by processing the audio data using one or more NLU or NLP modules, speech recognition engines or modules, or other modules, and the acoustic features may include but need not be limited to, sentiments, meanings, tones, genres, topics, emotions or other features, and may describe aspects of the sounds expressed therein, such as frequencies, speech rates, intensities or patterns.

At box 860, a current set of text or sentiment of the media program is determined based on the audio data transcribed at box 850 and the acoustic features identified at box 855.

At box 870, additional subject matter required to cause the media program to have the desired text or sentiment are identified. For example, to the extent that the set of text or sentiment of the media program determined at box 860 does not match the desired text or sentiment of the media program at box 830, subject matter (e.g., words or other sounds or acoustic features) that would, if included in the media program, result in an environment most favorable for the selected brand or advertisement may be identified. Such additional subject matter may include words to be spoken or sung, as well as acoustic features (e.g., sentiments, meanings, tones, genres, topics, emotions or aspects of sounds such as frequencies, speech rates, intensities or patterns) of media content, or any other subject matter that may be included in the media program with a goal toward establishing conditions that would result in the media program having the desired text and the desired sentiment identified at box 830.

At box 880, information regarding the additional subject matter is transmitted to a device of the creator. For example, the information transmitted to the device of the creator may identify any additional text or additional acoustic features that are required to establish conditions that would result in the media program having the desired text and the desired sentiment identified at box 830. Such information may be presented to the creator in any manner, e.g., by displaying the information in one or more user interfaces on a device of the creator, by playing some or all of the information by one or more speakers associated with the device of the creator, by sending at least some of the information to the device of the creator in one or more messages, or in any other manner.

At box 890, information for airing a selected advertisement of the brand during the media program is transmitted to the device of the creator, and the process ends. For example, the information for airing a selected advertisement may include data representing the selected advertisement, or one or more links to such data. In some implementations, where a selected advertisement includes words that are to be spoken or sung by the creator or another participant in the media program, such information may include such words, e.g., displayed in a user interface, spoken aloud in one or more speakers, or transmitted in a message, or a link to such words. Where a selected advertisement includes previously recorded media content (e.g., music or other sounds), the information may include one or more interactive elements (e.g., buttons) that may be selected to cause the media content to be played during the media program, or a link to the media content.

Figure 9A:
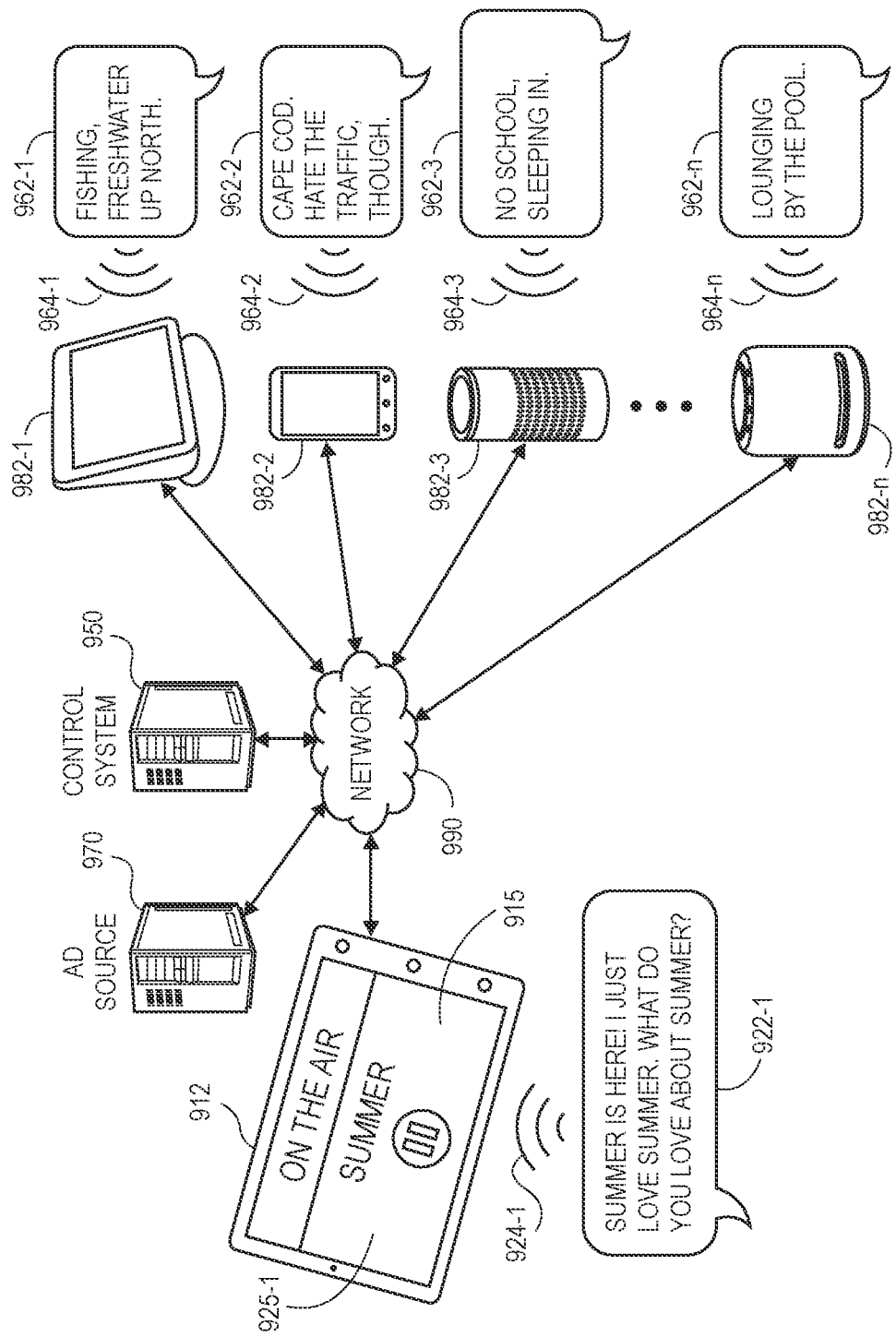

Referring to FIGS. 9A through 9C, views of aspects of one system for selecting advertisements for media programs in accordance with embodiments of the present disclosure are shown. Except where otherwise noted, reference numerals preceded by the number "9" shown in FIGS. 9A through 9C indicate components or features that are similar to components or features having reference numerals preceded by the number "7" shown in FIGS. 7A through 7F, by the number "3" shown in FIG. 3, by the number "2" shown in FIG. 2A or 2B, or by the number "1" shown in FIGS. 1A through 1F.

As is shown in FIG. 9A, a mobile device 912 of a creator, a control system 950, an advertisement source 970 and a plurality of devices 982-1, 982-2, 982-3 . . . 982-*n* are connected to one or more networks 990. The mobile device 912 includes a display 915 having a user interface 925-1 rendered thereon. The user interface 925-1 identifies a theme of a media program, viz., "Summer." The creator provides an utterance 922-1 to the mobile device 912 in accordance with a theme of the media program, viz., "Summer is here! I just love summer. What do you love about summer?" and invites one or more listeners to participate in the media program. The mobile device 912 captures audio data 924-1 representing the utterance 922-1, and transmits the data 924-1 to the control system 950 over the one or more networks 990.

In reply, a listener using the device 982-1 provides an utterance 962-1, viz., "Fishing, freshwater up north." A listener using the device 982-2 provides an utterance 962-2, viz., "Cape Cod. Hate the traffic, though." A listener using the device 982-3 provides an utterance 962-3, viz., "No school. Sleeping in." A listener using the device 982-*n* provides an utterance 962-*n*, viz., "Lounging by the pool." The respective devices 982-1, 982-2, 982-3 . . . 982-*n* capture data 964-1, 964-2, 964-3 . . . 964-*n* representing the utterances 962-1, 962-2 . . . 962-*n*, and transmit the data 964-1, 964-2, 964-3 . . . 964-*n* to the control system 950 over the one or more networks 990. The control system 950 may then cause data, e.g., the data 924-1 and some or all of the data 964-1, 964-2, 964-3 . . . 964-*n* or any other information, data or metadata, to be transmitted to the device 912 and the devices 982-1, 982-2, 982-3 . . . 982-*n* over the one or more networks 990.

As is shown in FIG. 9B, an advertisement 975 having a particularly high value (e.g., anticipated level of engagement) is stored by an advertisement system 970. The advertisement 975 is a fifteen-second clip that includes themes of "summer," "outdoors," "grilling" and "baseball." As is also shown in FIG. 9B, the control system 950 determines a classification 968A (or an embedding, a vector or another representation) of the media program, based on the data 924-1, 964-1, 964-2, 964-3 . . . 964-*n* shown in FIG. 9A. The classification 968A identifies a sentiment of the media program as "calm," and indicates that the media program includes topics of "summer" and "outdoors," and that participants in the media program are expressing emotions of "indifference." Alternatively, the classification 968A may relate to the creator or any of the listeners to the media program. The advertisement 975 may be selected by matching a brand associated with the advertisement with the creator according to any of the methods disclosed herein, or in any other manner. Alternatively, the advertisement 975 may be selected on any other basis and need not be associated with a brand that has been specifically identified as a match for the creator.

As is further shown in FIG. 9B, the control system 950 identifies a set 968B of recommended subjects to be discussed during the media program, viz., "grilling" and "baseball," based on differences between content of the advertisement 975 and the classification 968A of the media program.

As is shown in FIG. 9C, a user interface 925-2 rendered on the mobile device 912 of the creator includes information regarding the set 968B of recommended subjects, as well one or more buttons or other interactive elements for causing a playing of the advertisement 975. Upon identifying the advertisement 975, and determining differences between the advertisement 975 and the content of the media program based on the classification 968A shown in FIG. 9B, the control system 950 transmits information regarding the set 968B of recommended subjects to the mobile device 912 for presentation to the creator, along with code or other data for causing the advertisement 975 to be played by each of the devices 982-1, 982-2, 982-3 . . . 982-*n*. Alternatively, the information regarding the set 968B of recommended subjects may be transmitted to the mobile device 912 by the advertisement source 970 of FIG. 9A, or any other device or system (not shown).

Upon reviewing the user interface 925-2, the creator provides an utterance 922-2 to the mobile device 912 based on the set 968B of recommended subjects, viz., "That's great—and my favorite thing to do in the summer is to sit on the deck and listen to baseball. Reminds me of growing up, we'd grill out and put on the AM radio, day or night." The utterance 922-2, or like words, are anticipated to modify the subject of the media program slightly to include "grilling"

and "baseball," or to insert related words into the media program, or otherwise vary the sentiment of the conversation accordingly. The mobile device 912 captures data 924-2 representing the utterance 922-2 and transmits the data 924-2 to the control system 950 over the one or more networks 990. Subsequently, the creator 910 may initiate the transmission of the advertisement 975 to the devices 982-1, 982-2, 982-3 . . . 982-*n* by interacting with one or more buttons or other interactive elements in the user interface 925-2, or in any other manner.

Although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4, 5, 6 or 8, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two rightmost digits of a reference number in a figure indicate a component or a feature that is similar to components or features having reference numbers with the same two rightmost digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least a first data store and at least a first computer processor, wherein the first computer system is connected to one or more networks, and
   wherein the first data store has one or more sets of instructions stored thereon that, when executed by at least the first computer processor, cause the first computer system to perform a method comprising:
   identifying first audio data transmitted to at least a plurality of computer systems in accordance with a media program,
   wherein each of the plurality of computer systems is associated with at least one listener to the media program, and
   wherein at least a first portion of the first audio data is received from a second computer system associated with a creator of the media program;

determining that the first audio data represents at least a set of words;
determining at least one sentiment associated with the first audio data;
providing information regarding the set of words, information regarding the at least one sentiment, information regarding the media program and information regarding the creator as first inputs to a first machine learning model;
receiving a first output from the first machine learning model in response to the first inputs;
providing, for each of a plurality of brands, information regarding an advertisement for one of the plurality of brands, information regarding a product associated with one of the plurality of brands, and information regarding feedback of customers as inputs to a second machine learning model, wherein each of the inputs corresponds to one of the plurality of brands;
receiving outputs from the second machine learning model, wherein each of the outputs is received from the second machine learning model in response to one of the inputs, and wherein each of the outputs received from the second machine learning model corresponds to one of the plurality of brands;
selecting one of the plurality of brands based at least in part on the first output and the output received in response to the input corresponding to the selected one of the plurality of brands;
identifying an advertisement associated with the selected one of the plurality of brands; and
transmitting information associated with the advertisement to at least one of:
the second computer system; or
at least one of the plurality of computer systems.

2. The first computer system of claim 1, wherein the information associated with the advertisement is transmitted to the second computer system; and
wherein the method further comprises:
causing a display of at least some of the information associated with the advertisement on at least one display of the second computer system.

3. The first computer system of claim 2, wherein the information associated with the advertisement comprises a set of words associated with the selected one of the plurality of brands, and
wherein the method further comprises:
receiving, from the second computer system, second audio data captured by at least one acoustic sensor provided in association with the second computer system, wherein the second audio data represents at least some of the set of words spoken by the creator; and
transmitting at least a portion of the second audio data to the at least one of the plurality of computer systems.

4. The first computer system of claim 2, wherein the method further comprises:
receiving, from the second computer system, an instruction to cause at least second audio data to be transmitted to the at least one of the plurality of computer systems, wherein the second audio data represents a clip of media content corresponding to the advertisement.

5. The first computer system of claim 1, wherein the first machine learning model is a first artificial neural network of a multi-tower machine learning model,
wherein the second machine learning model is a second artificial neural network of the multi-tower machine learning model,
wherein the method further comprises:
receiving outputs from the multi-tower machine learning model, wherein each of the outputs is a score representing a match between the creator and one of the plurality of brands,
wherein selecting the one of the plurality of brands comprises:
identifying a highest score representing the matches between the creator and the plurality of brands,
wherein the selected one of the plurality of brands is associated with the highest score.

6. A method comprising:
identifying, by a first computer system, first audio data transmitted to at least a second computer system associated with a listener to a first media program, wherein the first audio data represents first media content transmitted in accordance with at least a first portion of the first media program;
determining, by the first computer system, that the first audio data represents at least a first set of words;
determining, by the first computer system, at least a first acoustic feature of the first media program based at least in part on the first audio data;
generating, by the first computer system, a first vector representative of the first media program based at least in part on the first set of words and the first acoustic feature;
identifying, by the first computer system, a first brand associated with a creator of the first media program based at least in part on the first vector;
selecting, by the first computer system, a first advertisement for the first media program, wherein the first advertisement is associated with one of the first brand or a first product of the first brand; and
transmitting, by the first computer system, second audio data associated with the first advertisement to at least the second computer system during the first media program.

7. The method of claim 6, further comprising:
identifying, by the first computer system, information regarding at least the first media program;
identifying, by the first computer system, information regarding the creator;
providing, by the first computer system, at least the first set of words, information regarding the first acoustic feature, the information regarding at least the first media program, and the information regarding the creator to a first machine learning model as a first input; and
receiving at least a first output from the first machine learning model,
wherein the first vector is generated based at least in part on the first output.

8. The method of claim 7,
wherein the information regarding at least the first media program comprises:
a description of the media program;
a viewer rating of the media program; and
an identifier of at least one listener to the media program, and
wherein the information regarding the creator comprises:
a second set of words represented in second audio data transmitted to at least a third computer system associated with a listener to a second media program, wherein the creator of the first media program is a creator of the second media program;
a second acoustic feature of the second audio data; and
feedback regarding the second media program received from the listener to the second media program.

9. The method of claim 7, further comprising:
identifying, by at least the first computer system, a plurality of advertisements, wherein each of the plurality of advertisements is associated with one of a plurality of brands, and wherein the plurality of brands includes the first brand;
determining, by at least the first computer system, at least one keyword associated with each of the plurality of brands, wherein the at least one keyword is determined for each of the plurality of brands based at least in part on at least one of the plurality of advertisements associated with the one of the plurality of brands;
determining, by at least the first computer system, an acoustic feature associated with each of the plurality of brands, wherein the acoustic feature is determined for each of the plurality of brands based at least in part on the at least one of the plurality of advertisement associated with the one of the plurality of brands;
generating, by at least the first computer system, vectors representative of each of the brands based at least in part on the at least one keyword associated with each of the plurality of brands and the acoustic feature associated with each of the plurality of brands; and
determining, by at least the first computer system, that a second vector of the vectors matches the first vector,
wherein identifying the first brand associated with the creator of the first media program comprises:
determining that the second vector is representative of the first brand.

10. The method of claim 6, wherein generating the first vector comprises:
providing, by the first computer system, information regarding at least the first set of words and the first acoustic feature as a first input to a first encoder of a multi-tower machine learning model; and
receiving, by the first computer system, a first output from the multi-tower machine learning model in response to the first input,
wherein the first vector is generated based at least in part on the first output,
wherein identifying the first brand associated with the creator comprises:
identifying, by at least the first computer system, a plurality of advertisements, wherein each of the plurality of advertisements is associated with one of a plurality of brands, and wherein the plurality of brands includes the first brand;
determining, by at least the first computer system, at least one keyword associated with each of the plurality of brands based at least in part on the plurality of advertisements;
determining, by at least the first computer system, at least one acoustic feature associated with each of the plurality of brands based at least in part on the plurality of advertisements;
providing, by the first computer system, information regarding each of the plurality of brands as inputs to a second encoder of the multi-tower machine learning model, wherein each of the inputs comprises the at least one keyword and the at least one acoustic feature of one of the plurality of brands;
receiving, by the first computer system, outputs from the second encoder in response to the inputs, wherein each of the outputs corresponds to one of the inputs;
calculating, by the first computer system, scores representing matches between the creator and the plurality of brands, wherein each of the scores is determined for the creator and one of the plurality of brands based at least in part on the first output and one of the outputs corresponding to the one of the plurality of brands;
identifying, by the first computer system, a highest score of the scores; and
determining, by the first computer system, that the highest score corresponds to the first brand.

11. The method of claim 10, wherein the first encoder is a first artificial neural network having a first input layer and at least a first hidden layer,
wherein the second encoder is a second artificial network having a second input layer and at least a second hidden layer,
wherein the first vector is generated by the first hidden layer, and
wherein each of the vectors is generated by the second hidden layer.

12. The method of claim 6, further comprising:
transmitting, by the first computer system, information comprising at least a second set of words to a third computer system, wherein the third computer system is associated with a creator of the first media program; and
receiving, by the first computer system, the second audio data from the third computer system,
wherein the second audio data is captured by at least one acoustic sensor provided on the third computer system, and
wherein the second audio data represents at least the second set of words spoken by the creator.

13. The method of claim 6, wherein the second audio data represents second media content including the first advertisement.

14. The method of claim 6, further comprising:
receiving, by the first computer system, at least a first portion of the first audio data from the third computer system,
wherein the first portion of the first audio data is captured by at least one acoustic sensor provided on the third computer system, and
wherein the first portion of the first audio data represents at least the first set of words spoken by the creator.

15. The method of claim 6, wherein the first portion of the first media program corresponds to a first interval of time, wherein the method further comprises:
identifying, by the first computer system, third audio data transmitted to at least the second computer system, wherein the third audio data represents second media content transmitted in accordance with at least a second portion of the first media program, and wherein the second portion of the first media program corresponds to a second interval of time;
determining, by the first computer system, that the third audio data represents at least a second set of words;
determining, by the first computer system, at least a second acoustic feature of the third audio data;
generating, by the first computer system, a second classification of the first media program based at least in part on the second set of words and the second acoustic feature; and selecting, by the first computer system, a second advertisement for the first media program based at least in part on the second classification of the first media program.

16. The method of claim 6, wherein selecting the first advertisement for the first media program comprises
   determining at least one attribute of each of a plurality of advertisements of the first brand, wherein the first advertisement is one of the plurality of advertisements; and
   determining that the at least one attribute of the first advertisement is consistent with at least one of the first set of words or the first sentiment.

17. The method of claim 6, wherein the second computer system is at least a portion of one of:
   an automobile;
   a desktop computer;
   a laptop computer;
   a media player;
   a smartphone;
   a smart speaker;
   a tablet computer; or
   a wristwatch.

18. A method comprising:
   transmitting, by a first computer system, first audio data of a media program associated with a creator of the media program to each of a plurality of devices over one or more networks, wherein each of the plurality of computer systems is associated with at least one listener to the media program;
   providing, by the first computer system, information regarding at least one word of the first audio data and at least one acoustic feature of the first audio data to a first encoder of a multi-tower machine learning model as a first input;
   identifying, by the first computer system, a first output from the first encoder in response to the first input;
   identifying, by at least the first computer system, a plurality of advertisements, wherein each of the plurality of advertisements is associated with one of a plurality of brands;
   providing, by the first computer system, information regarding keywords expressed in the plurality of advertisements and sentiments of the plurality of advertisements to a second encoder of the multi-tower machine learning model as inputs;
   identifying, by the first computer system, outputs from the second encoder in response to the inputs, wherein each of the outputs corresponds to one of the brands;
   identifying, by the first computer system, scores representing matches between the creator and each of the plurality of brands, wherein each of the scores is calculated by the multi-tower machine learning model based at least in part on the first output and the outputs;
   determining, by the first computer system, that a score representing a match between the creator and a first brand is a highest score of the scores; and
   in response to determining that the score representing the match between the creator and the first brand is the highest score,
      causing, by the first computer system, second audio data associated with a first advertisement for the first brand or a product of the first brand to be transmitted to each of the plurality of computer devices.

19. The method of claim 18, wherein determining that the classification is consistent with the first advertisement comprises:
   determining at least one attribute of each of a plurality of advertisements, wherein the first advertisement is one of the plurality of advertisements; and
   determining that the at least one attribute of the first advertisement is consistent with the classification.

20. The method of claim 18, further comprising:
   transmitting, by the first computer system, information comprising at least a set of words to a third computer system, wherein the third computer system is associated with a creator of the media program; and
   receiving, by the first computer system, at least a portion of the second audio data from the third computer system,
   wherein the second audio data is captured by at least one acoustic sensor provided on the third computer system, and
   wherein the second audio data represents at least the set of words spoken by the creator.

* * * * *